(12) United States Patent
Smith et al.

(10) Patent No.: US 8,991,894 B2
(45) Date of Patent: Mar. 31, 2015

(54) PICKUP BED UTILITY MANAGEMENT SYSTEM

(71) Applicant: Cortney Smith, Las Vegas, NV (US)

(72) Inventors: Cortney Smith, Las Vegas, NV (US); Jon Reale, Henderson, NV (US); Steven Schneider, Henderson, NV (US)

(73) Assignee: Cortney Smith, Las Vegas, NV (US)

( * ) Notice: Subject to any disclaimer, the term of this patent is extended or adjusted under 35 U.S.C. 154(b) by 0 days.

(21) Appl. No.: 14/269,000

(22) Filed: May 2, 2014

(65) Prior Publication Data

US 2014/0333082 A1    Nov. 13, 2014

Related U.S. Application Data

(60) Provisional application No. 61/893,591, filed on Oct. 21, 2013, provisional application No. 61/819,204, filed on May 3, 2013.

(51) Int. Cl.
| | |
|---|---|
| *B60P 7/02* | (2006.01) |
| *B60P 3/42* | (2006.01) |
| *B60P 1/43* | (2006.01) |
| *B62D 33/10* | (2006.01) |
| *B60R 9/06* | (2006.01) |

(52) U.S. Cl.
CPC . *B60P 3/42* (2013.01); *B60P 1/435* (2013.01); *B60P 7/02* (2013.01); *B62D 33/10* (2013.01); *B60R 9/065* (2013.01)

USPC ............... 296/100.09; 296/136.03; 296/61; 414/537

(58) Field of Classification Search
USPC ............. 296/26.11, 100.01, 100.02, 100.06, 296/100.07, 100.08, 100.09, 136.03, 61; 414/537
See application file for complete search history.

(56) References Cited

U.S. PATENT DOCUMENTS

| | | | |
|---|---|---|---|
| 5,312,148 A | 5/1994 | Morgan | |
| 5,752,800 A | 5/1998 | Brincks | |
| 6,374,466 B1 | 4/2002 | Macias | |
| 6,447,040 B1 | 9/2002 | Young | |
| 6,739,269 B1 | 5/2004 | Benton | |
| 2004/0032142 A1 | 2/2004 | Sherrer | |
| 2010/0270784 A1 | 10/2010 | Blair | |

*Primary Examiner* — Jason S Morrow
*Assistant Examiner* — E Turner Hicks

(57) ABSTRACT

A configurable pickup bed utility management system features a segmented panel assembly pivotally mounted to a pickup bed. The panel assembly features a first panel, a second panel pivotally located on the first panel, a third panel pivotally located on the second panel, and a fourth panel pivotally located on the third panel. A plurality of curved linear extrusions with ridges are located on the panels. The panel assembly can be fully extended over the pickup bed forming a bed cover structure, fully extended posterior to the pickup bed forming a work surface structure, fully extended posterior to the pickup bed forming a ramp structure, partially extended posterior to the pickup bed forming a sun shade structure, folded into the pickup bed forming a lockable toolbox, or folded into the pickup bed forming a bed extender.

9 Claims, 33 Drawing Sheets

RAMP

SUN SHADE

TOOL BOX

BED EXTENDER

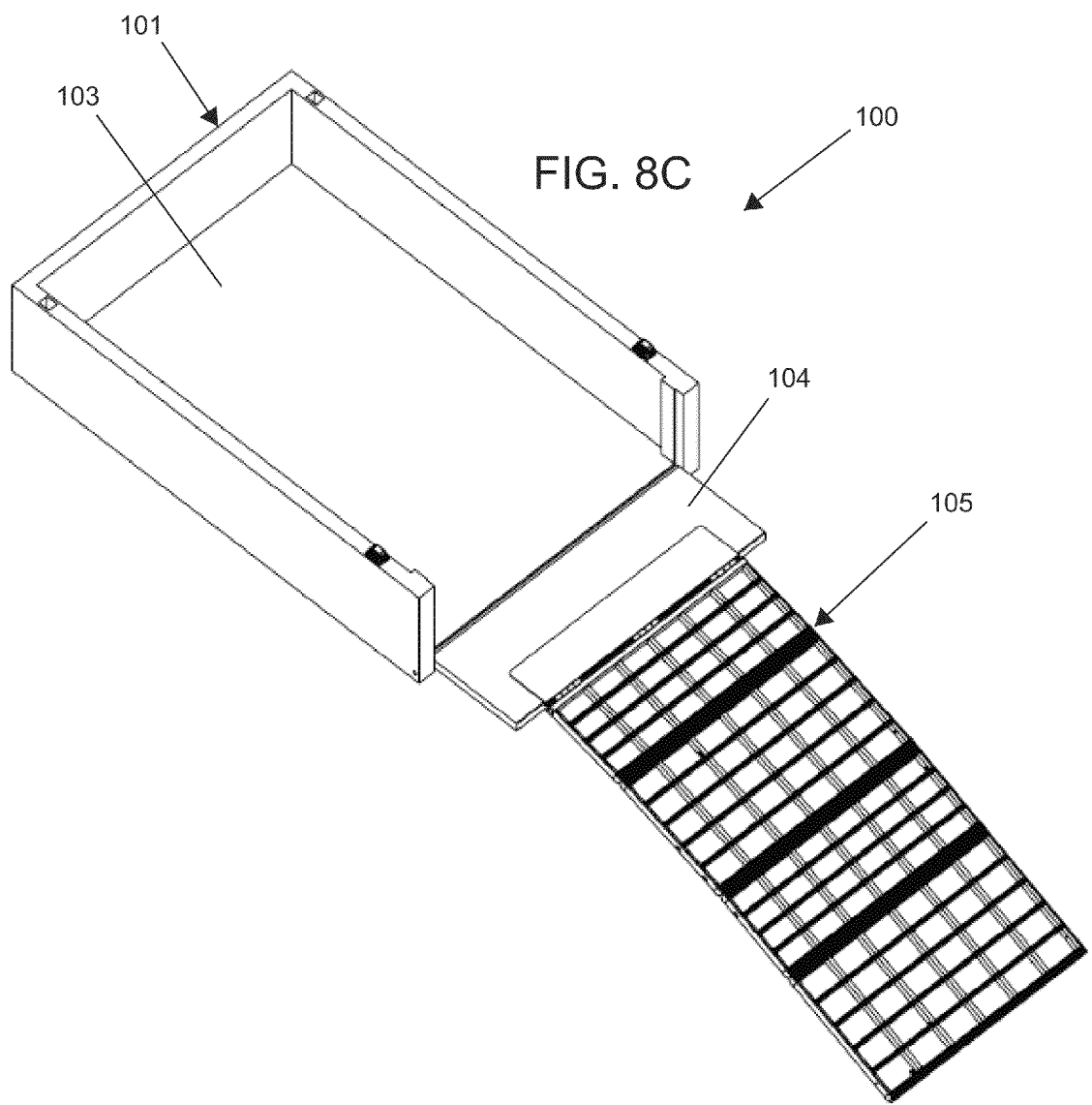

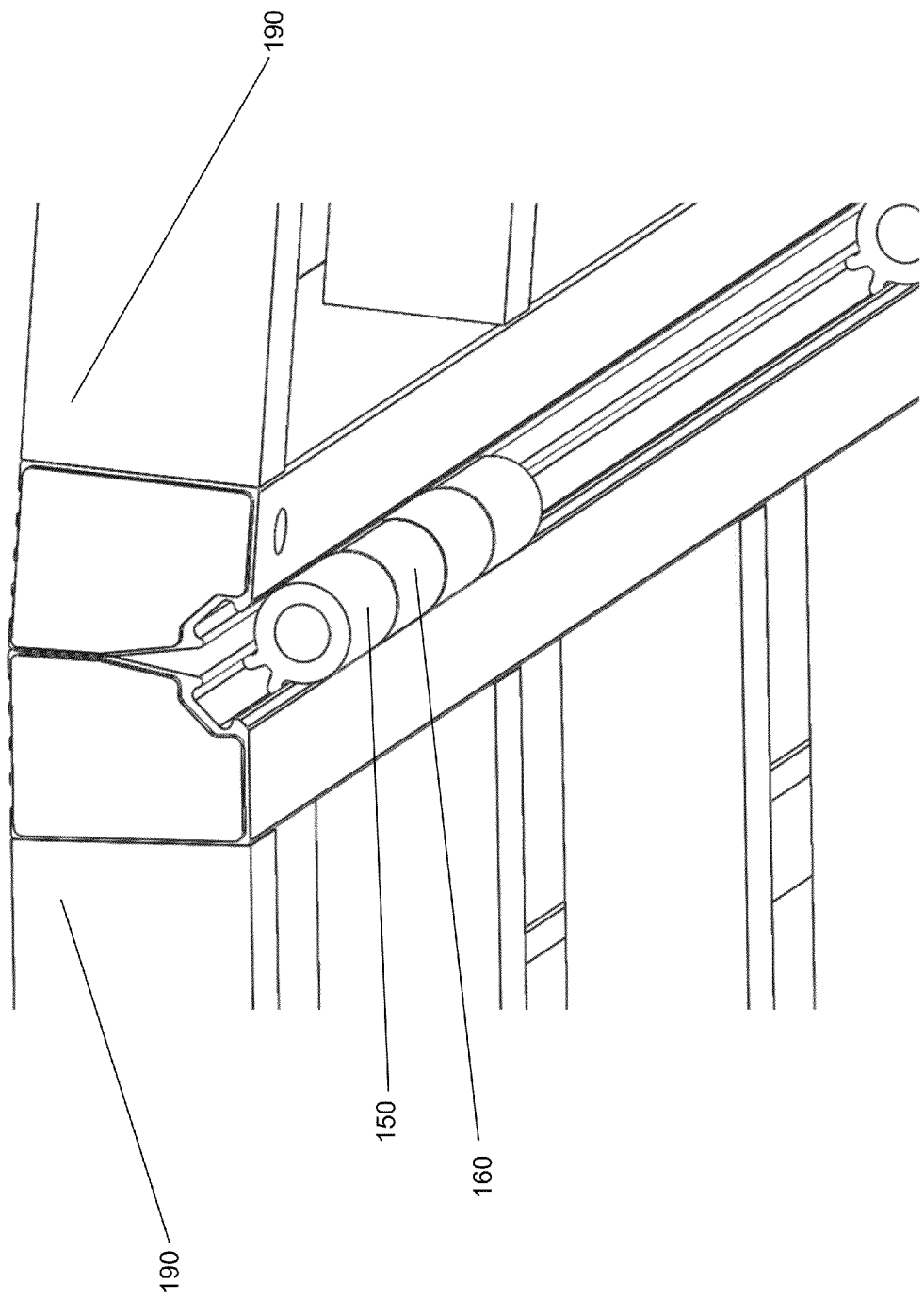

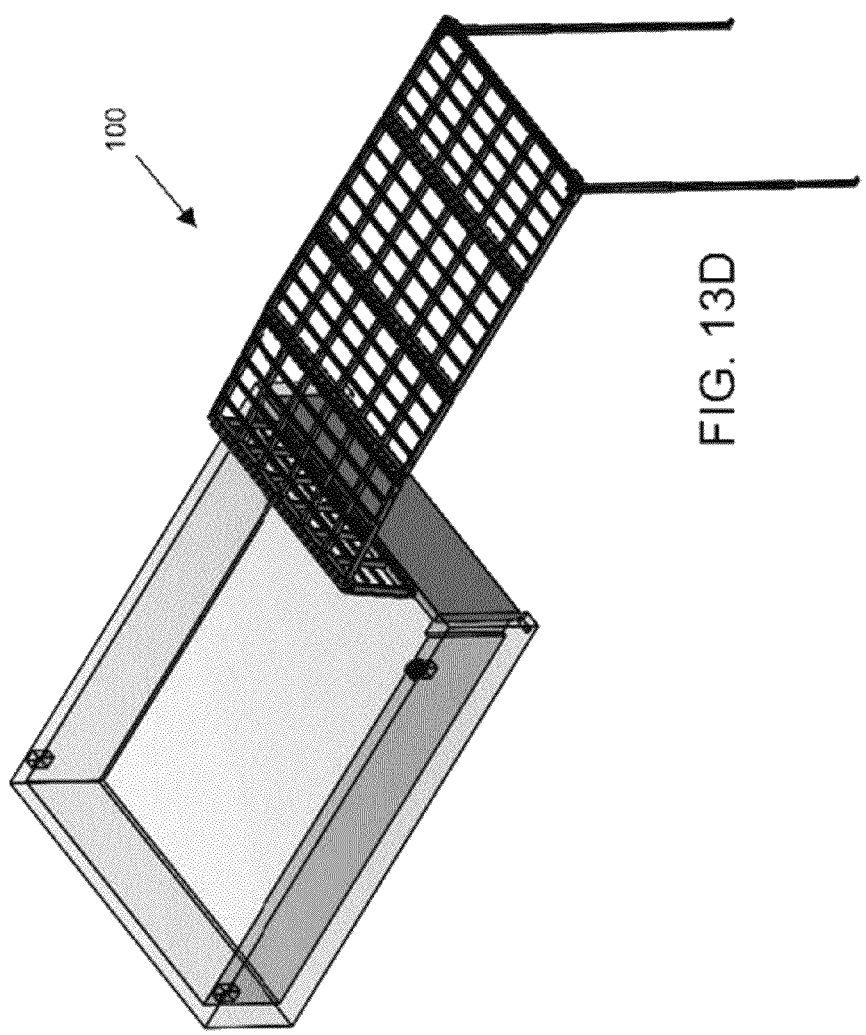

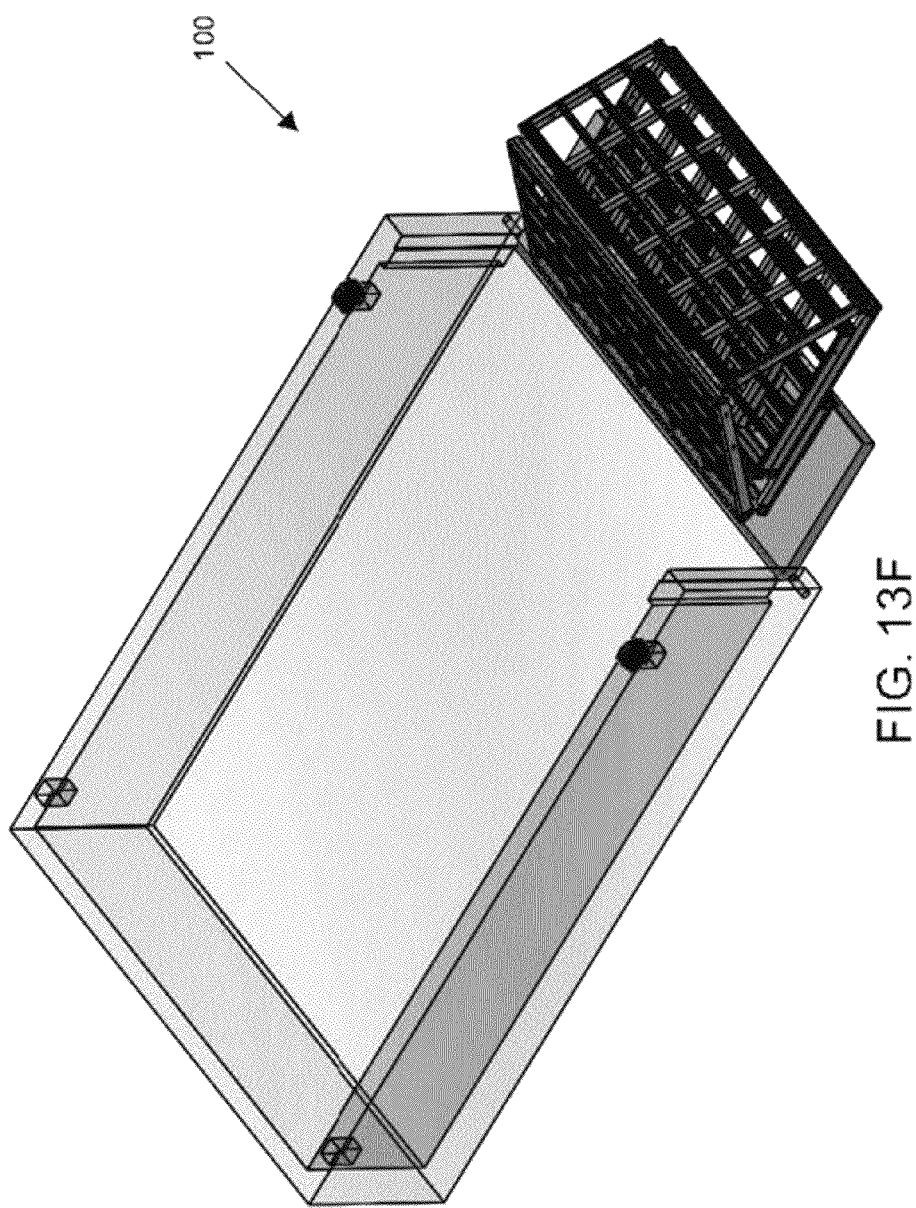

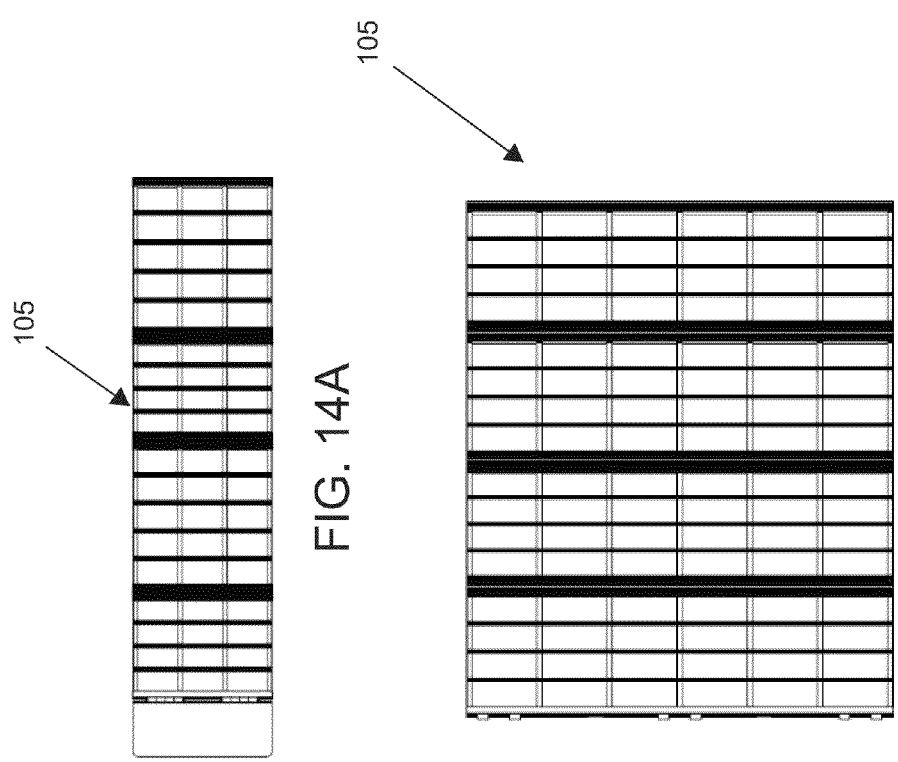

PICKUP BED UTILITY MANAGEMENT SYSTEM

CROSS REFERENCE

This application claims priority to U.S. Patent Application No. 61/819,204, filed May 3, 2013 and U.S. Patent Application No. 61/893,591, filed Oct. 21, 2013, the specifications of which are incorporated herein in their entirety by reference.

FIELD OF THE INVENTION

The present invention relates to pickup bed cargo management systems.

BACKGROUND OF THE INVENTION

Pickup beds have been used for hauling cargo for over a hundred years. Although there is some variation in the specific design of pickup beds, in most cases, they are based around a flat bottom surface that often has surrounding side rails. Because of the variety in the type of cargo hauled, a variety of accessories has been developed to enhance the functionality of the pickup bed including toolboxes, ramps, tie downs, cargo covers, bed covers, topper shells, campers, and other devices. These individual accessories, however can be expensive and a challenge to store when not in use. The present invention features a configurable pickup bed utility management system for enhancing functionality of a pickup bed.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a configurable pickup bed utility management system for enhancing the functionality of a pickup bed. In some embodiments, the system comprises a pickup bed. In some embodiments, the system comprises a segmented panel assembly.

In some embodiments, the panel assembly comprises a planar first panel.

In some embodiments, the panel assembly comprises a planar second panel. In some embodiments, the second panel is located on the first panel via a first hinge component of the second panel pivotally connecting to a second hinge component of the first panel. In some embodiments, a first joint range of motion is between about 0 and an angle less than 180 degrees. In some embodiments, upon full extension, the first panel and the second panel never lie on the same plane. In some embodiments, a first joint range of motion is between 0 and about 180 degrees.

In some embodiments, the panel assembly comprises a planar third panel. In some embodiments, the third panel is located on the second panel via a first hinge component of the third panel pivotally connecting to a second hinge component of the second panel. In some embodiments, a second joint range of motion is between about 0 and an angle less than about 180 degrees. In some embodiments, upon full extension, the second panel and the third panel never lie on the same plane.

In some embodiments, the panel assembly comprises a planar fourth panel. In some embodiments, the fourth panel is located on the third panel via a first hinge component of the fourth panel pivotally connecting to a second hinge component of the third panel. In some embodiments, a third joint range of motion is about between 0 and about 180 degrees. In some embodiments, upon full extension, the third panel and the fourth panel lie on the same plane.

In some embodiments, a first panel width, a second panel width, a third panel width, and a fourth panel width are equal. In some embodiments, a plurality of linear extrusions are located on the panels from a panel first side to a panel second side. In some embodiments, each extrusion comprise a plurality of ridges located on a convexly curved top surface thereon. In some embodiments, each ridge comprises a shape of an inverted "V".

In some embodiments, the panel assembly is pivotally located on the pickup bed.

In some embodiments, in a first configuration, the panel assembly is fully extended over the pickup bed forming a bed cover structure to cover an open pickup bed top. In some embodiments, in a second configuration, the panel assembly is fully extended posterior to the pickup bed forming a work surface structure. In some embodiments, in a third configuration, the panel assembly is fully extended posterior to the pickup bed forming a ramp structure. In some embodiments, in a fourth configuration, the panel assembly is partially extended posterior to the pickup bed forming a sun shade structure. In some embodiments, in a fifth configuration, the panel assembly is folded into the pickup bed forming a lockable toolbox. In some embodiments, in a sixth configuration, the panel assembly is folded into the pickup bed forming a bed extender.

BRIEF DESCRIPTION OF THE DRAWINGS

FIG. 8C shows a perspective view of the panel assembly of the present invention in a third configuration as a ramp structure.

FIG. 9B shows a close up view of the first hinge component and the second hinge component located on the panels of the present invention.

FIG. 14A shows a top view of alternate embodiment of the panel assembly of the present invention.

FIG. 14B shows a top view of alternate embodiment of the panel assembly of the present invention.

DESCRIPTION OF PREFERRED EMBODIMENTS

Figure 1A:
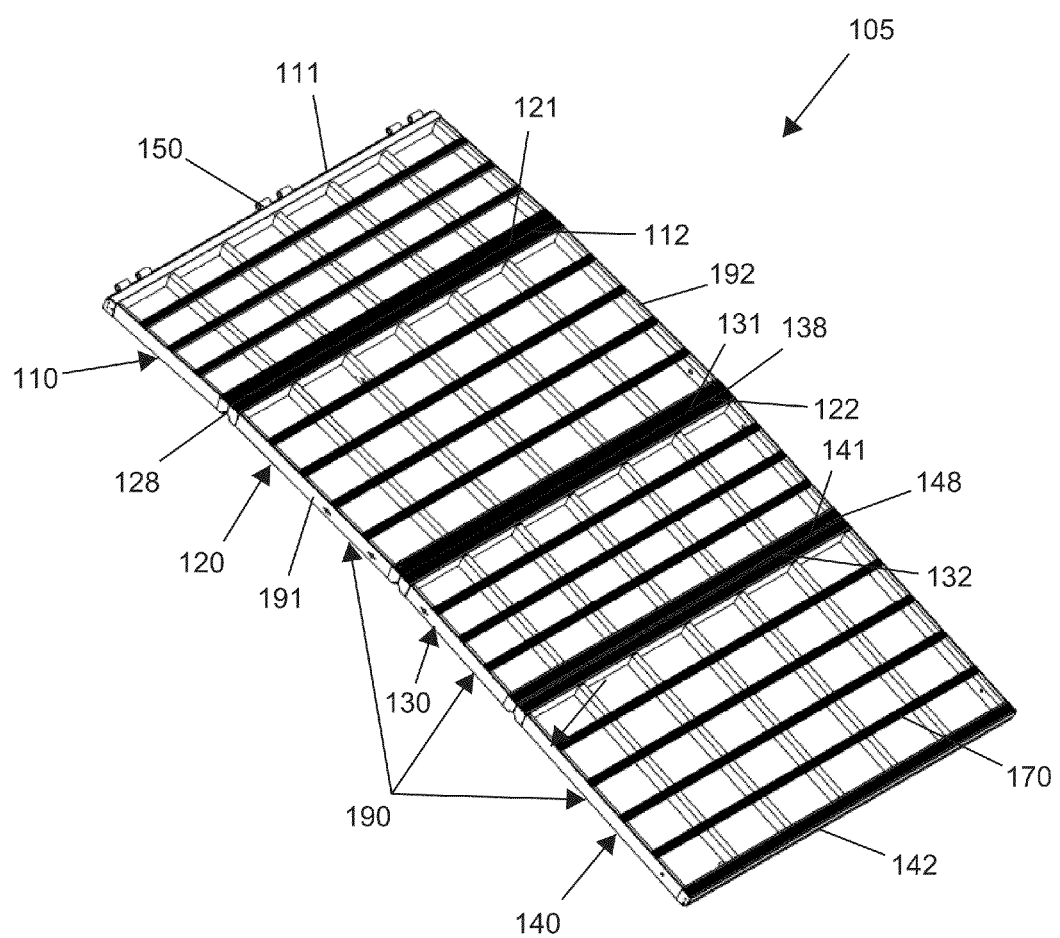
FIG. 1A shows a perspective view of the panel assembly of the present invention without an attachment panel.
Figure 1B:
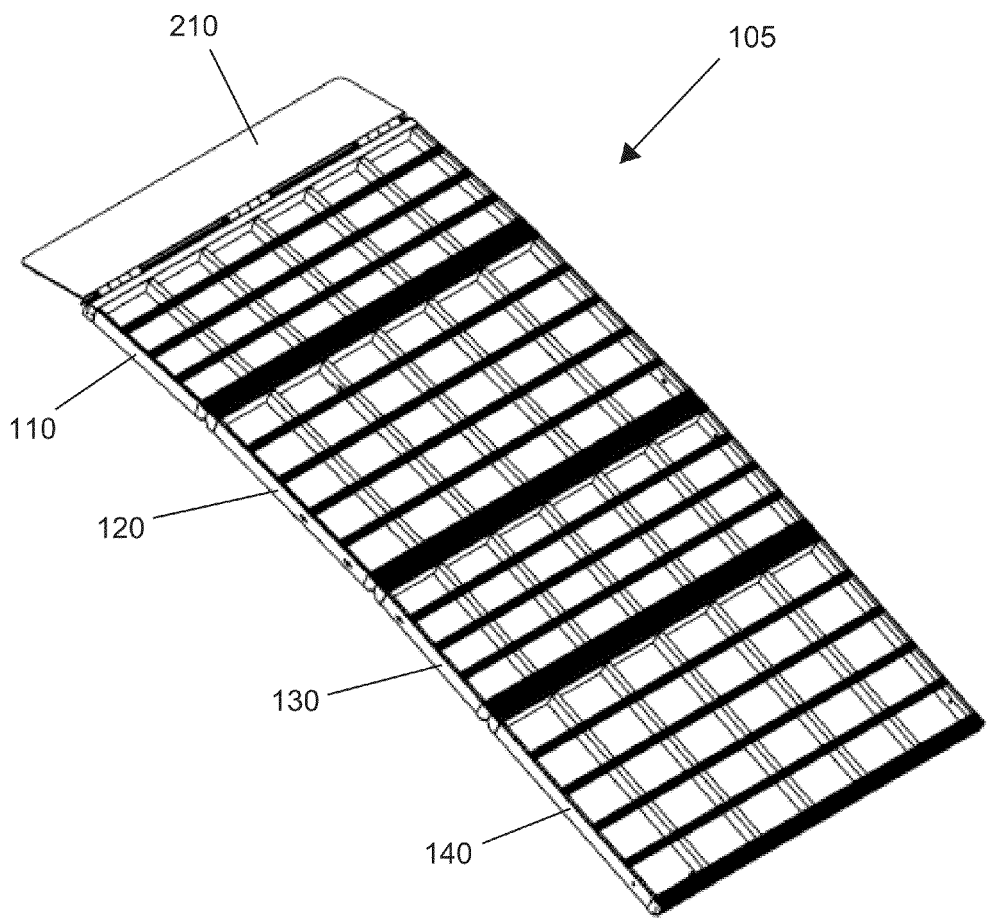
FIG. 1B shows a perspective view of the panel assembly of the present invention with an attachment panel.
Figure 2:
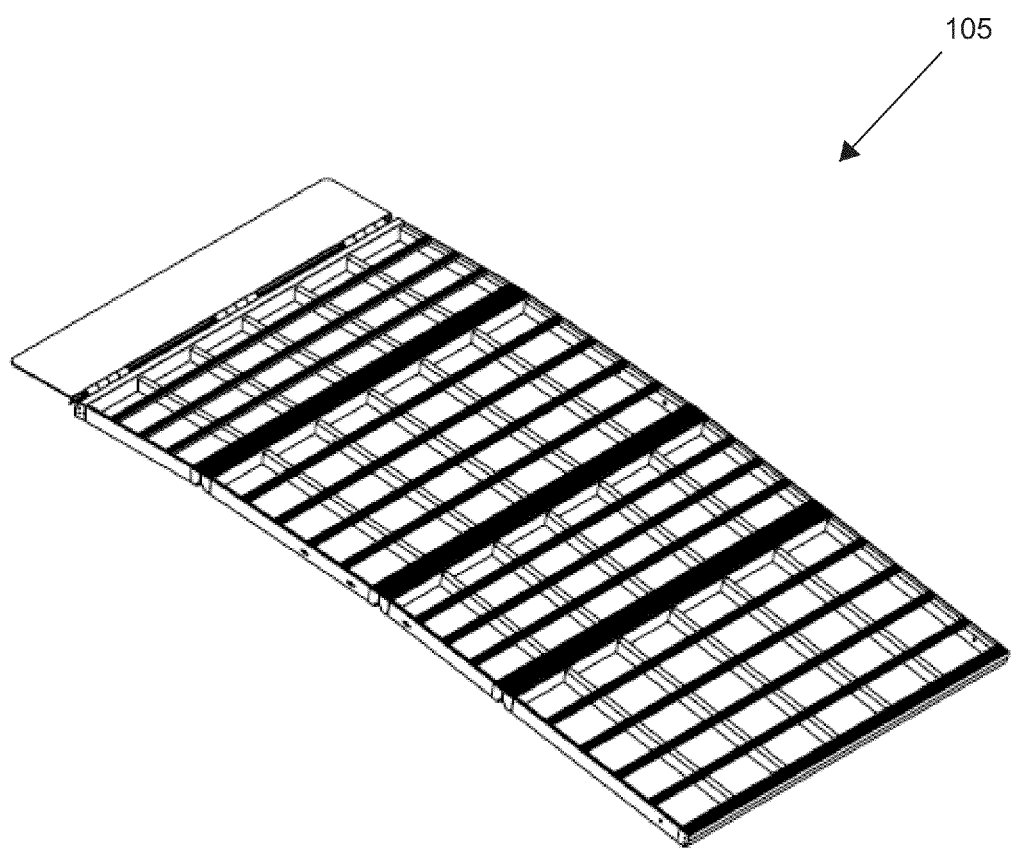
FIG. 2 shows a perspective view of the panel assembly of the present invention with an attachment panel
Figure 3A:
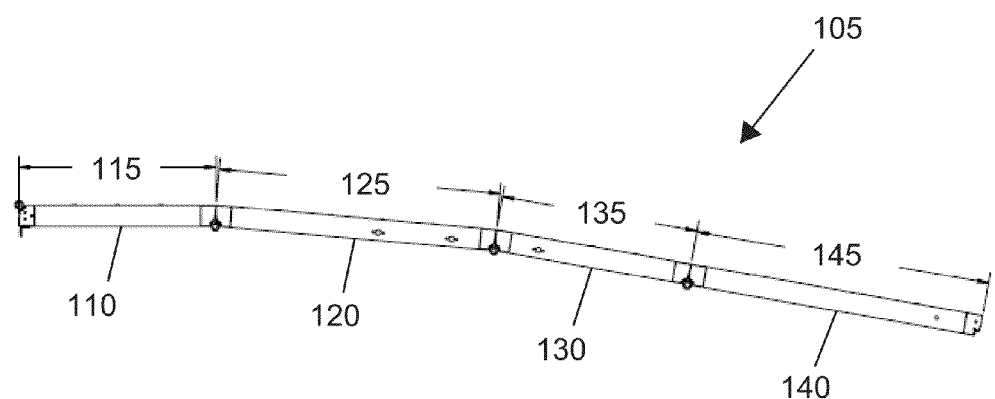
FIG. 3A shows a side view of the panel assembly of the present invention without an attachment panel.
Figure 3B:
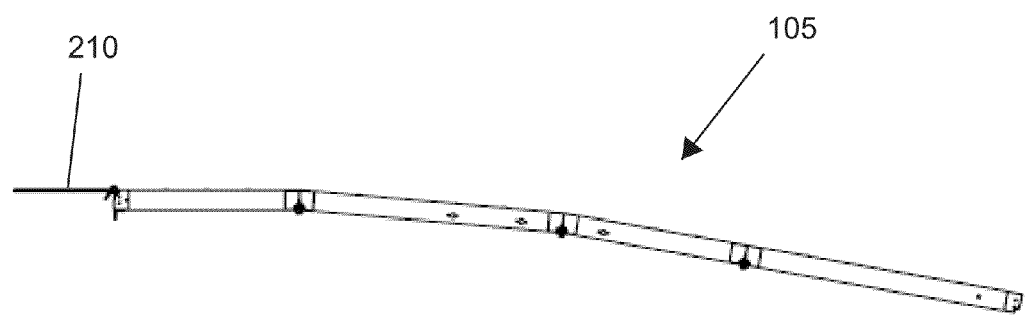
FIG. 3B shows a side view of the panel assembly of the present invention with an attachment panel.
Figure 4B:
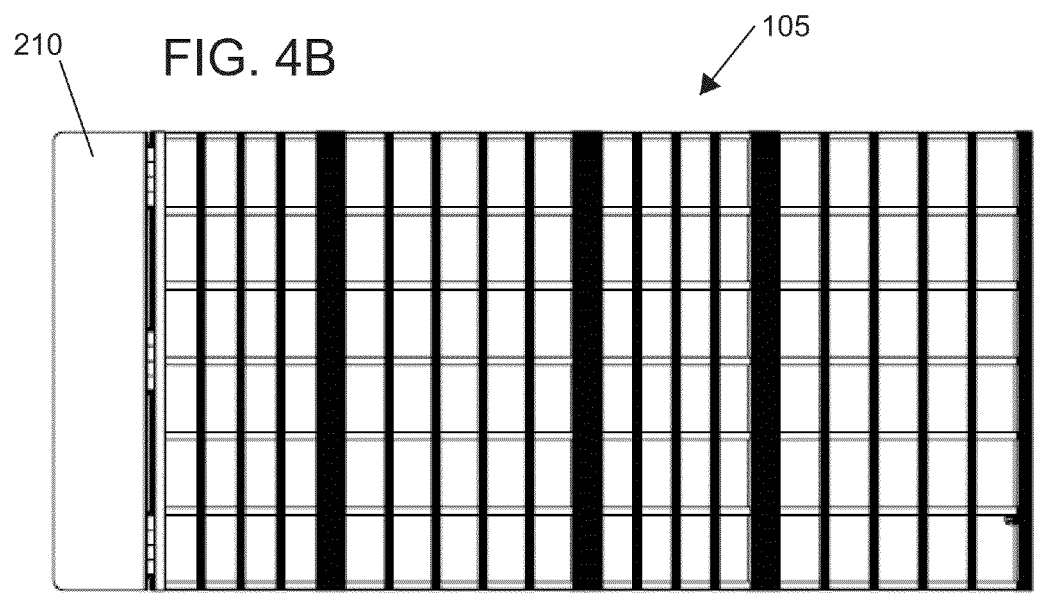
FIG. 4B shows a top view of the panel assembly of the present invention with an attachment panel.
Figure 4A:
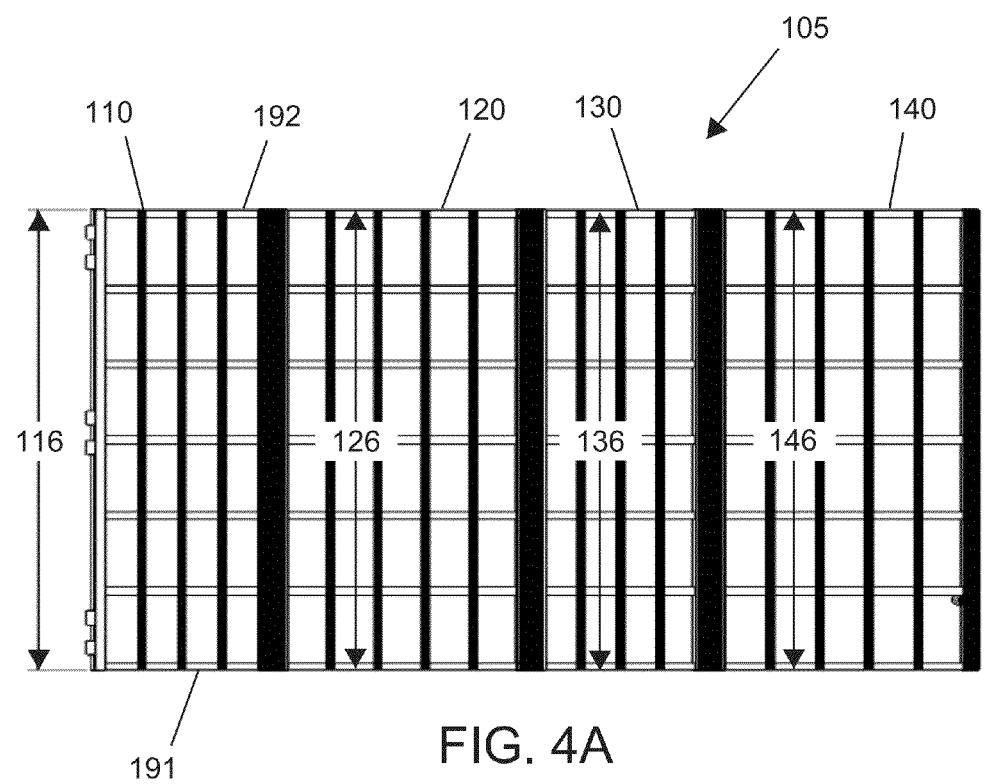
FIG. 4A shows a top view of the panel assembly of the present invention without an attachment panel.
Figure 5A:
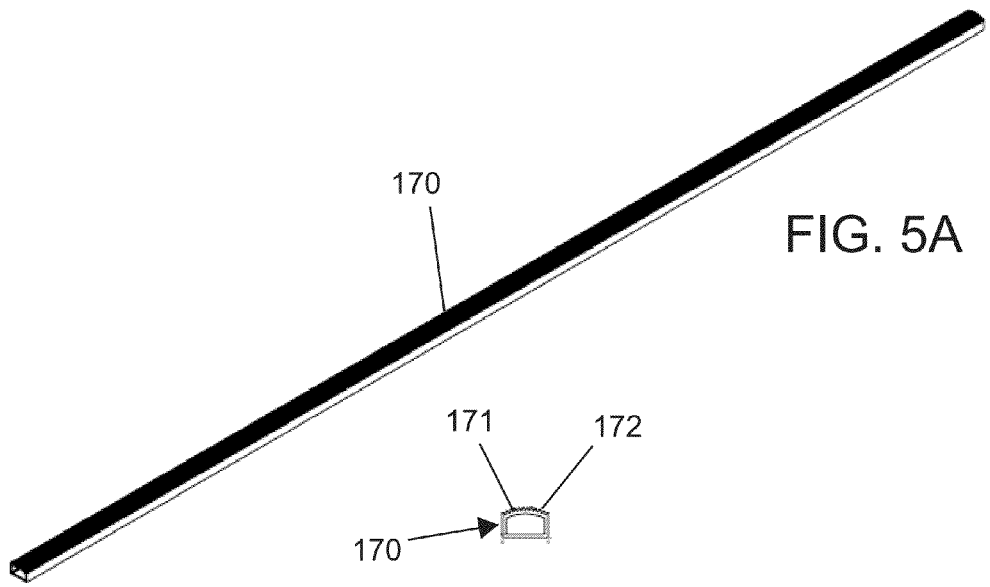
FIG. 5A shows a perspective view of the "traction bar" extrusion of the present invention.
Figure 5B:
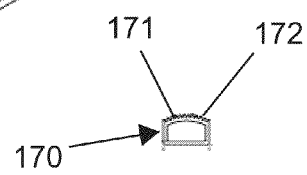
FIG. 5B shows a cross-sectional view of the extrusion of the present invention.
Figure 5C:
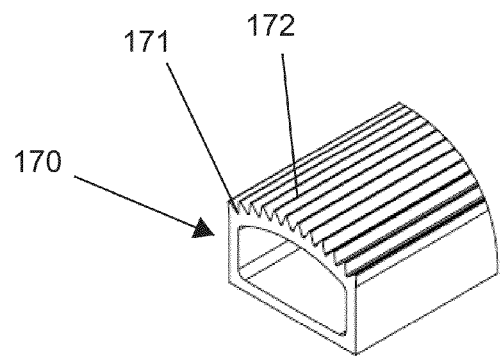
FIG. 5C shows a perspective view of the extrusion of the present invention.
Figure 6A:
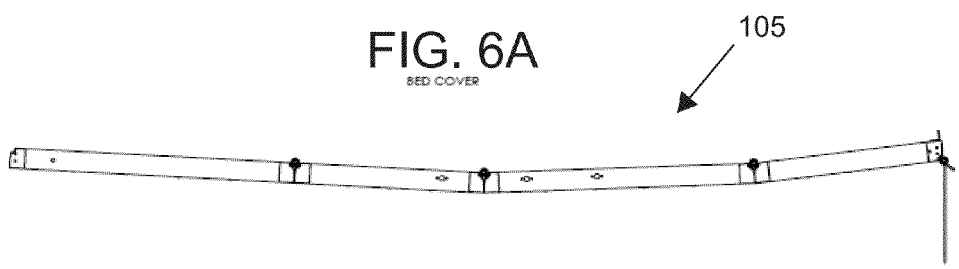
FIG. 6A shows a side view of the panel assembly of the present invention in a first configuration as a bed cover structure.
Figure 6B:
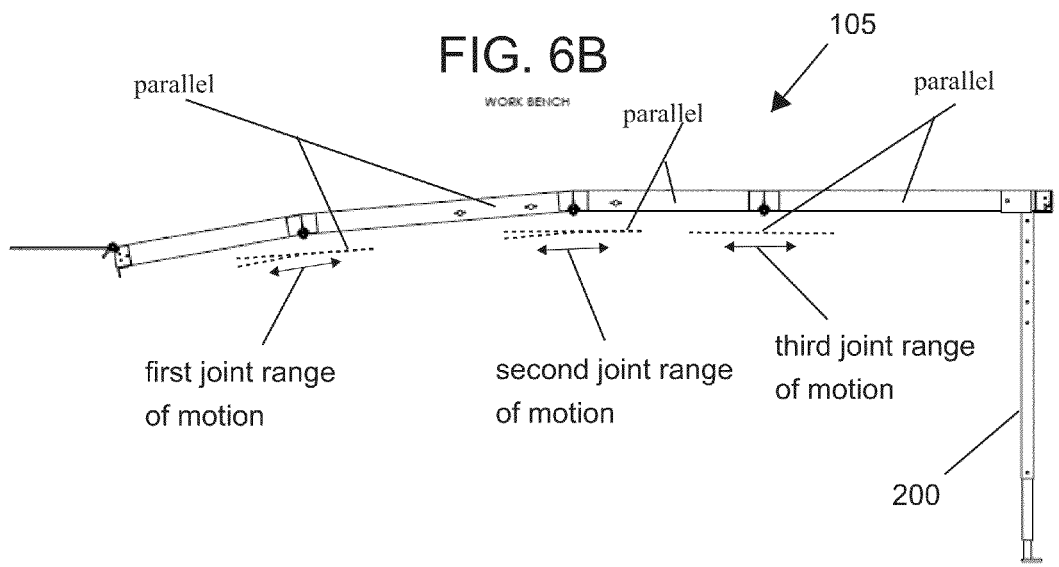
FIG. 6B shows a side view of the panel assembly of the present invention in a second configuration as a work surface structure featuring an expanding leg. Range of motion is indicated for the first joint, the second joint and the third joint.
Figure 6C:
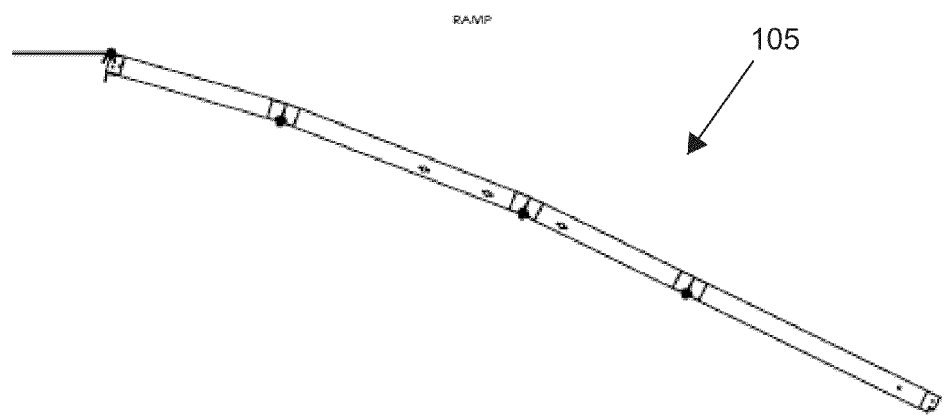
FIG. 6C shows a side view of the panel assembly of the present invention in a third configuration as a ramp structure.
Figure 6D:
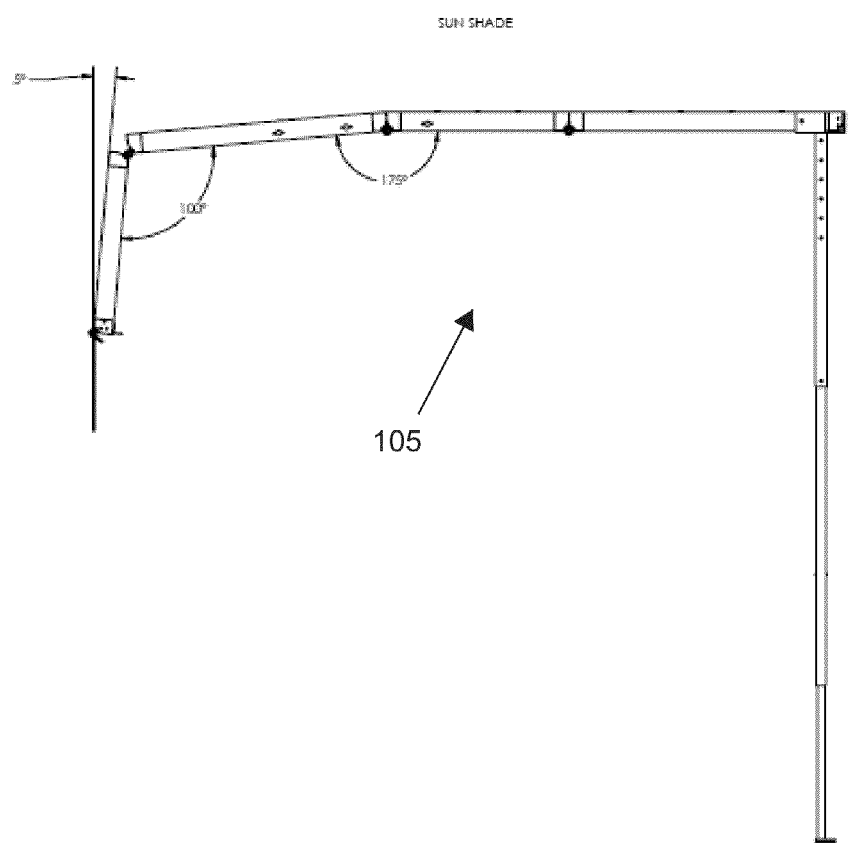
FIG. 6D shows a side view of the panel assembly of the present invention in a fourth configuration as a sun shade structure. Specific angles are indicated for the attachment panel joint, the first joint, and the second joint for the fourth configuration. The panel assembly is held into a static position via the expanding leg.
Figure 6E:
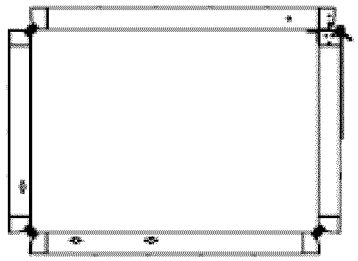
FIG. 6E shows a side view of the panel assembly of the present invention in a fifth configuration as lockable toolbox. The first panel and the fourth panel are lockably attached.
Figure 6F:
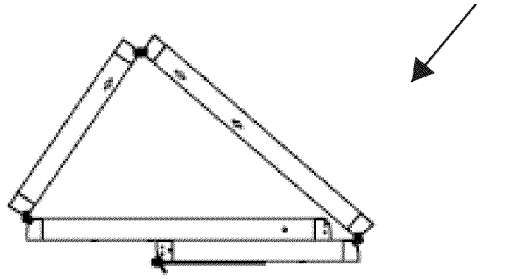
FIG. 6F shows a side view of the panel assembly of the present invention in a sixth configuration as a bed extender. The first panel and the fourth panel overlap and are lockably attached.
Figure 7A:
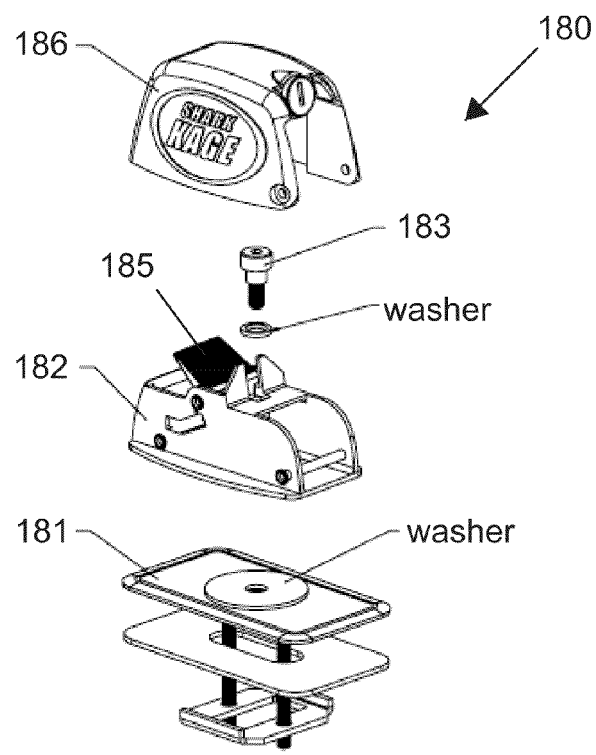
FIG. 7A shows an exploded view of the strap lock of the present invention.
Figures 7B, 7C:
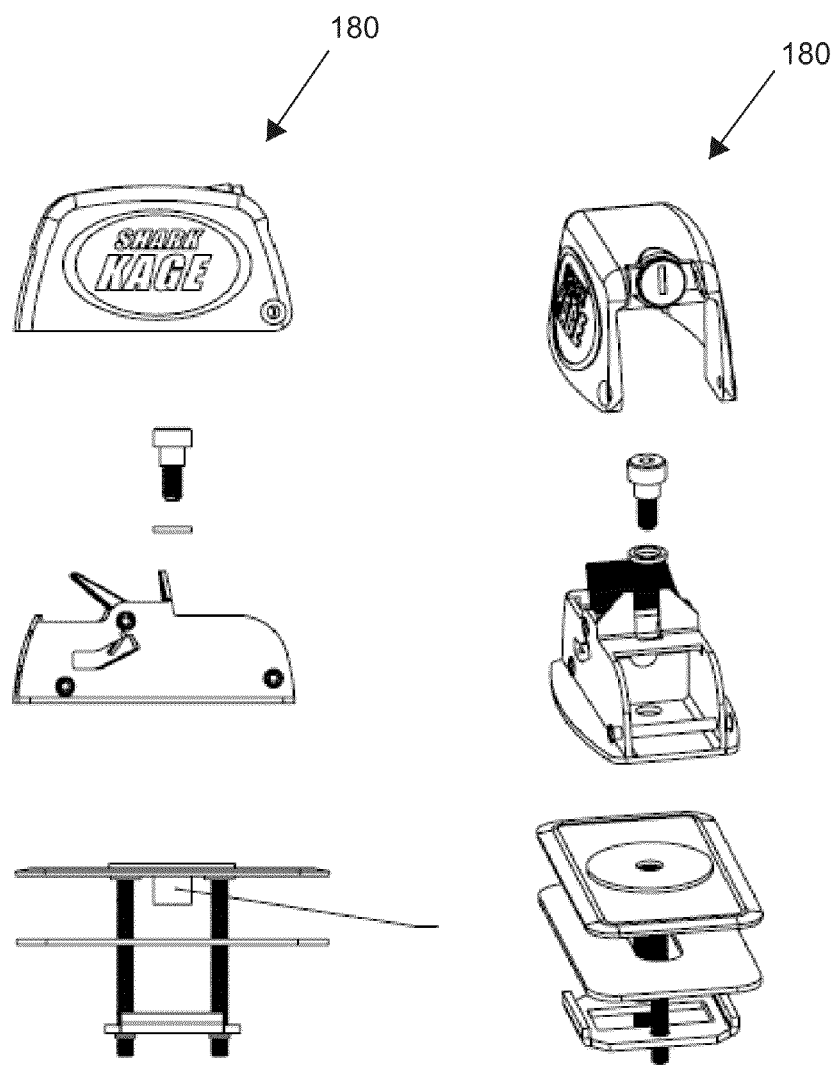
FIG. 7B shows an exploded view of the strap lock of the present invention.
FIG. 7C shows an exploded view of the strap lock of the present invention.
Figure 8A:
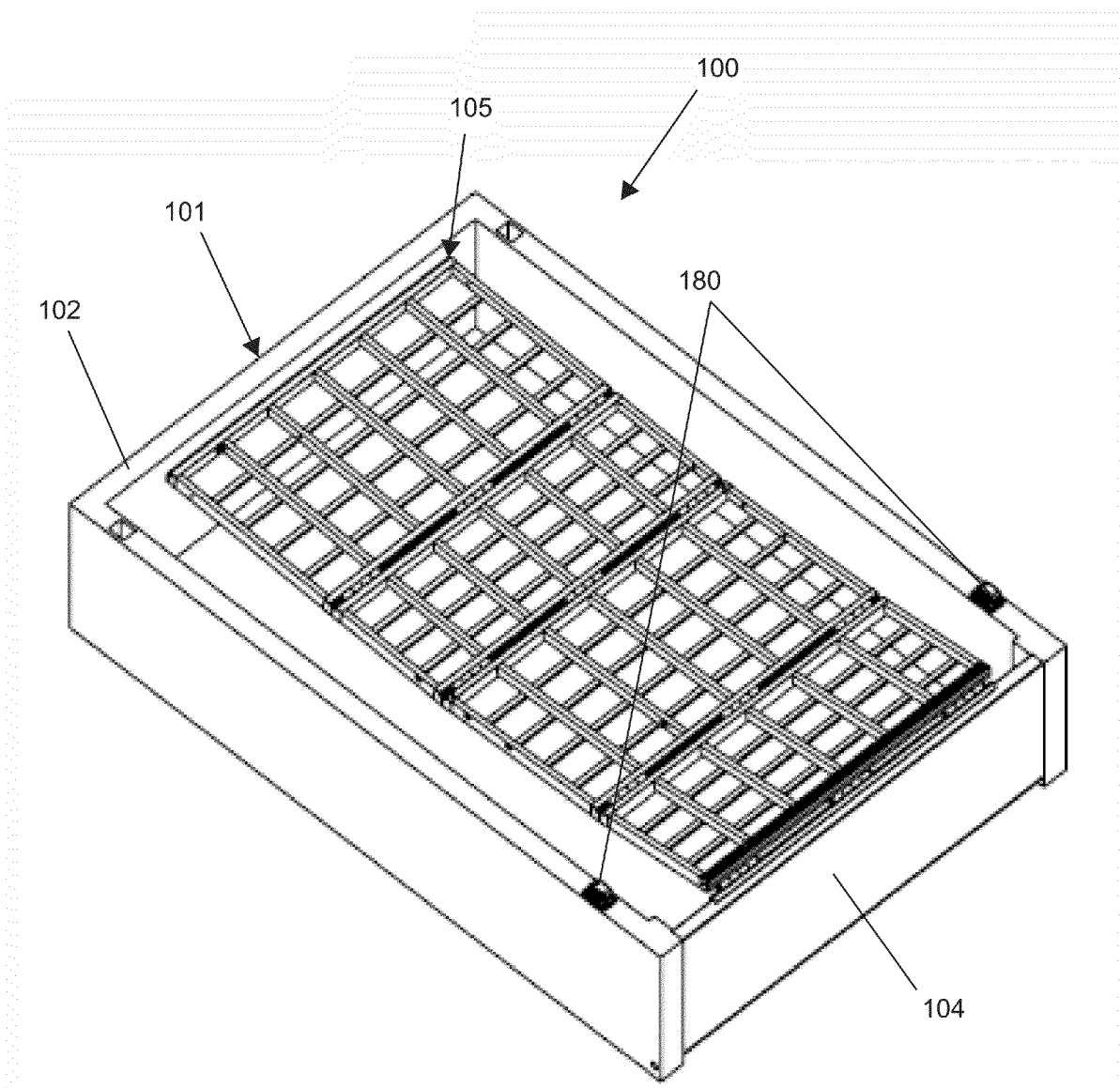
FIG. 8A shows a perspective view of the panel assembly of the present invention in a first configuration as a bed cover structure.
Figure 8B:
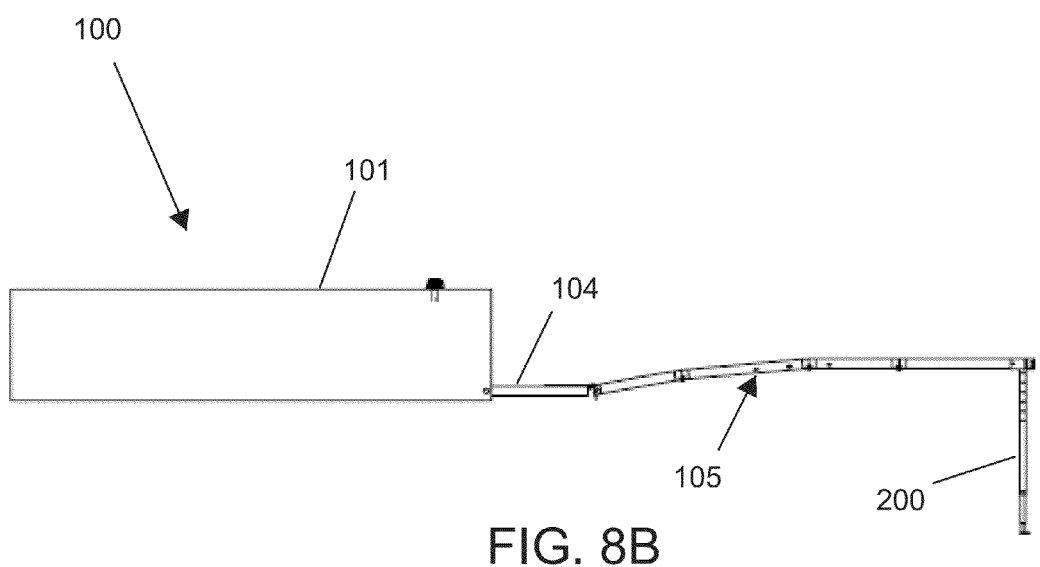
FIG. 8B shows a side view of the panel assembly of the present invention in a second configuration as a work surface structure. The panel assembly is supported by an expanding leg.
Figure 8D:
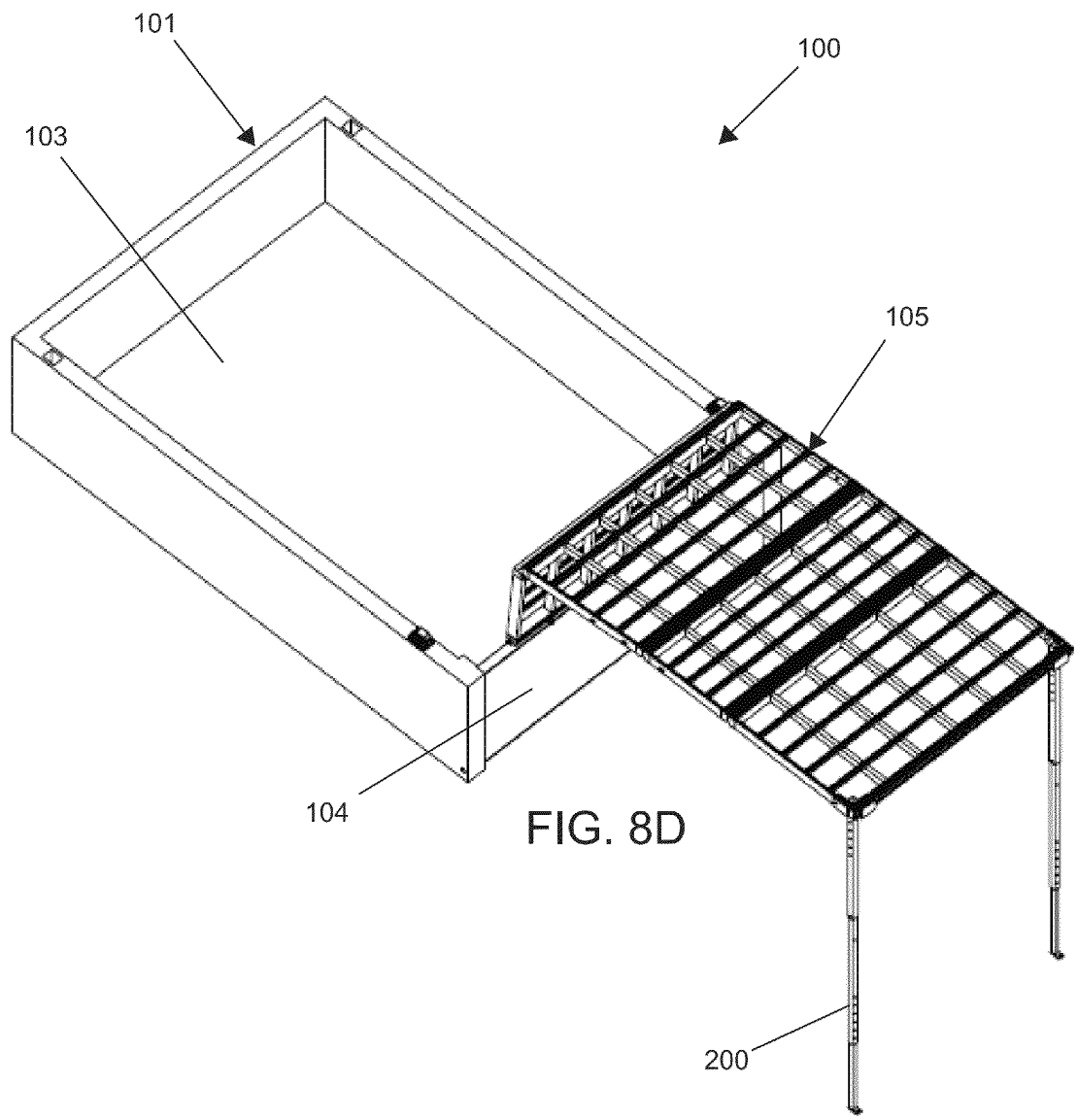
FIG. 8D shows a perspective view of the panel assembly of the present invention in a fourth configuration as a sun shade structure. The panel assembly is supported by an expanding leg.
Figure 8E:
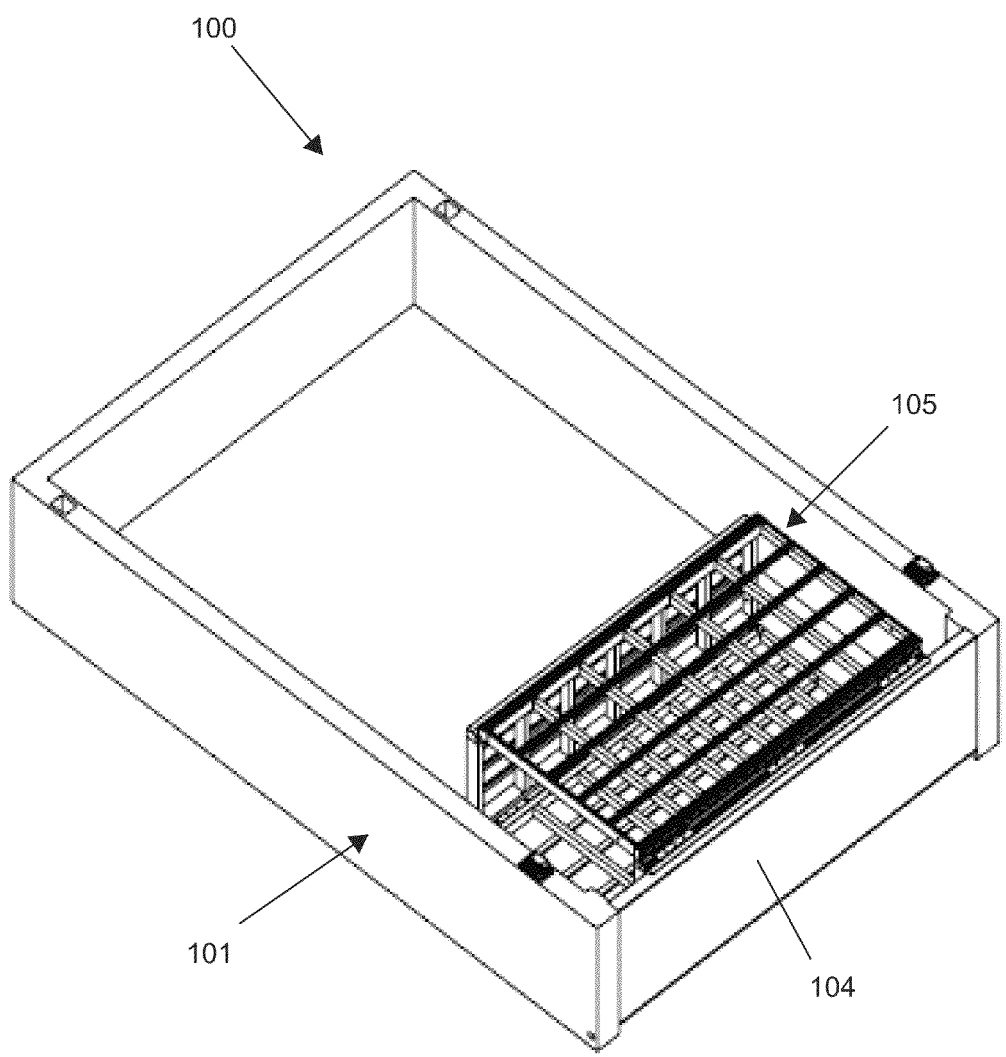
FIG. 8E shows a perspective view of the panel assembly of the present invention in a fifth configuration as lockable toolbox.
Figure 8F:
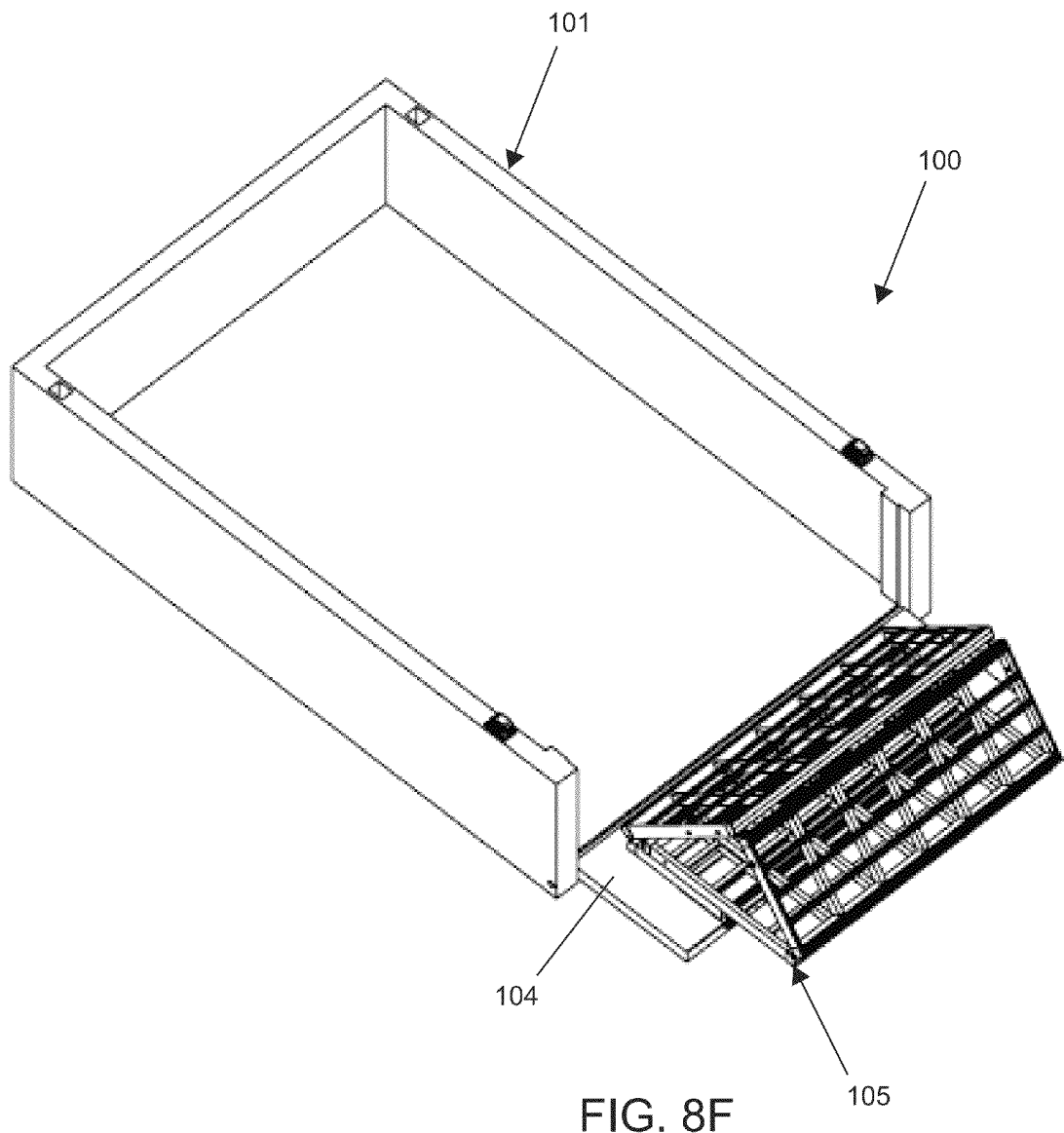
FIG. 8F shows a perspective view of the panel assembly of the present invention in a sixth configuration as a bed extender.
Figure 9A:
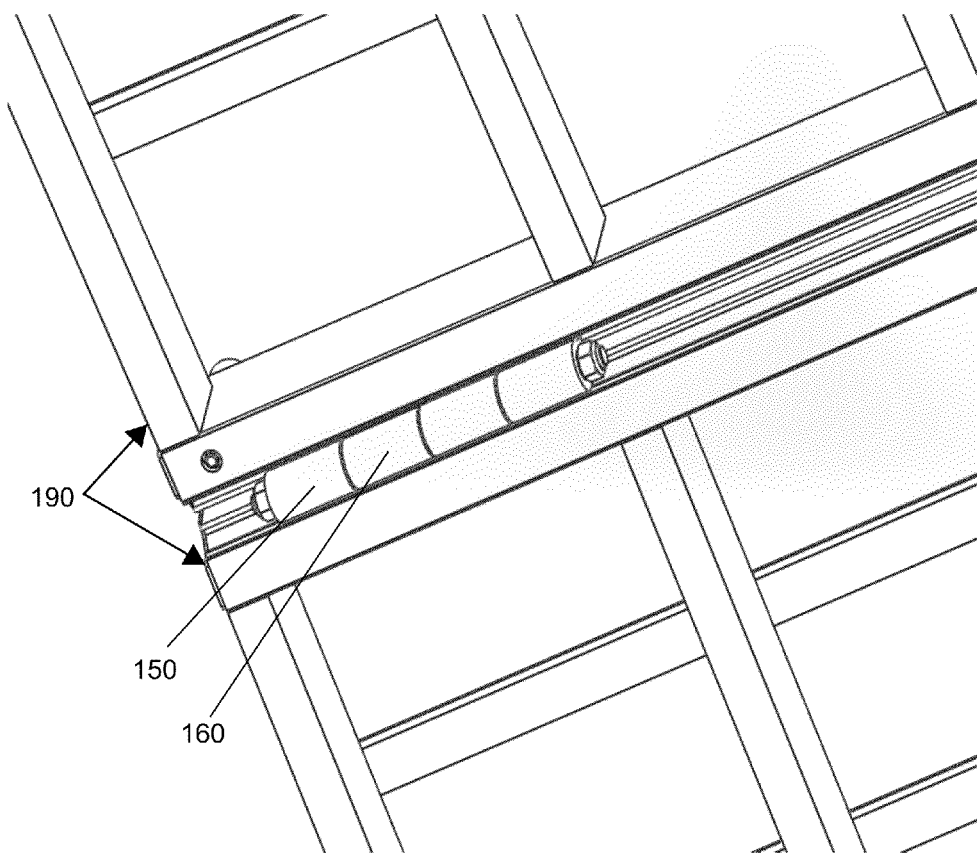
FIG. 9A shows a close up view of the first hinge component and the second hinge component located on the panels of the present invention.
Figure 9C:
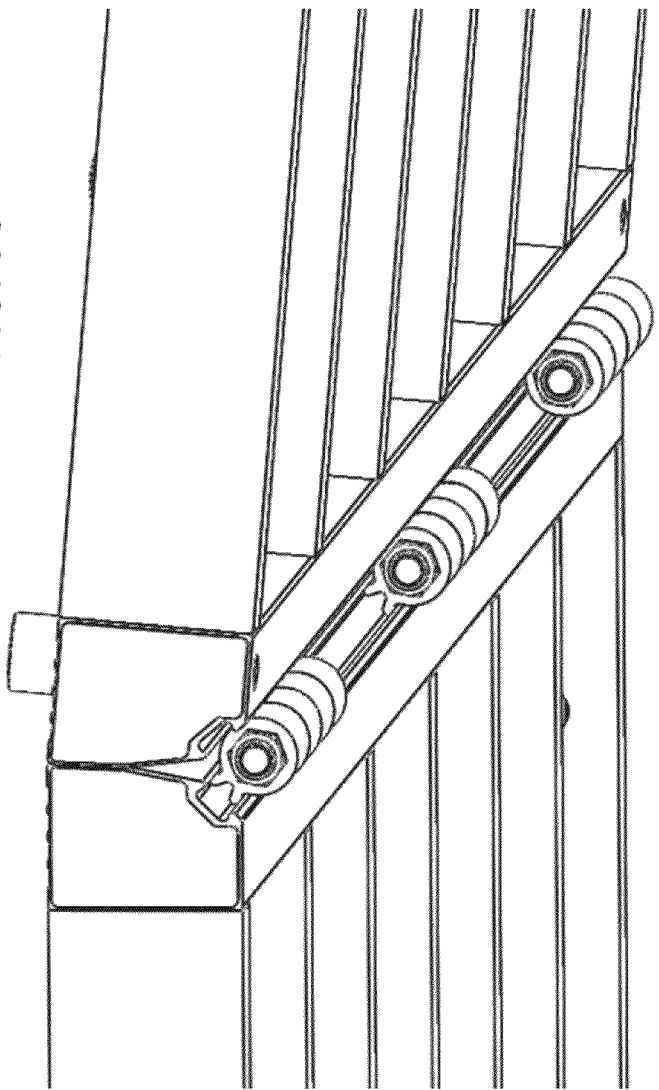
FIG. 9C shows a close up view of the first hinge component and the second hinge component located on the panels of the present invention.
Figure 9D:
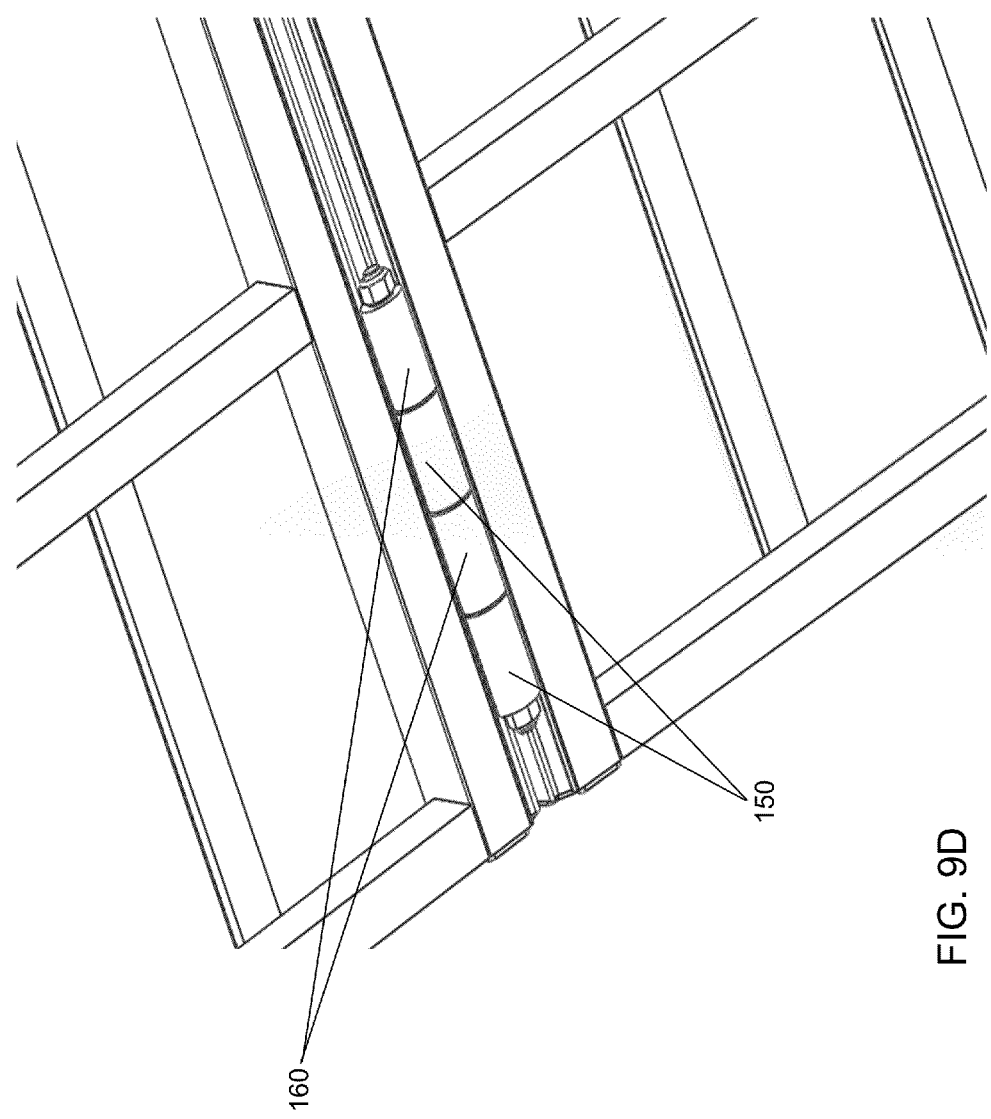
FIG. 9D shows a close up view of the first hinge component and the second hinge component located on the panels of the present invention.
Figure 10A:
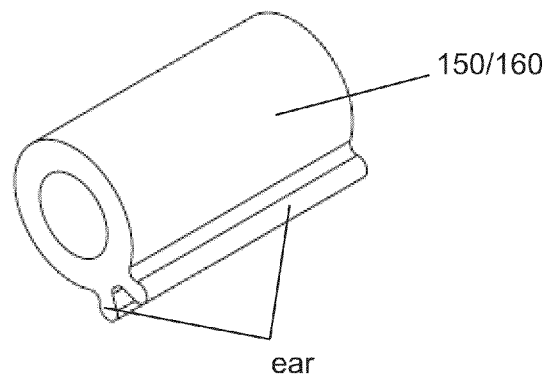
FIG. 10A shows a perspective view of the hinge component before installation featuring two longitudinal ears projecting at an angle from each other.
Figure 10B:
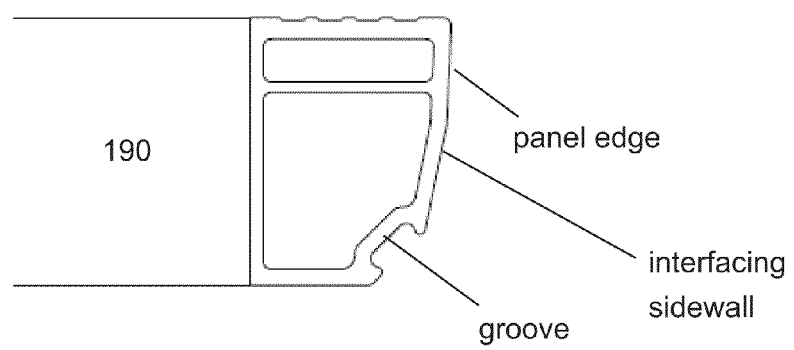
FIG. 10B shows a cross-sectional view of a panel edge before installation featuring a longitudinal groove adapted to receive the longitudinal ears of the hinge component. The groove that receives the longitudinal ears of the hinge is located at an angle at a lowermost corner of the extrusion. An interfacing sidewall is set at an angle.
Figure 11A:
FIG. 11A shows a side view an alternate embodiment of the panel assembly of the present invention in a first configuration as a bed cover structure.
Figure 11B:
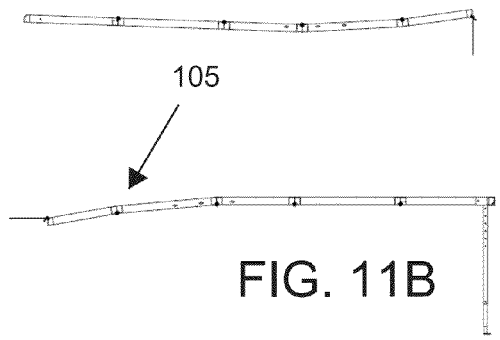
FIG. 11B shows a side view of an alternate embodiment of the panel assembly of the present invention in a second configuration as a work surface structure featuring an expanding leg.
Figure 11C:
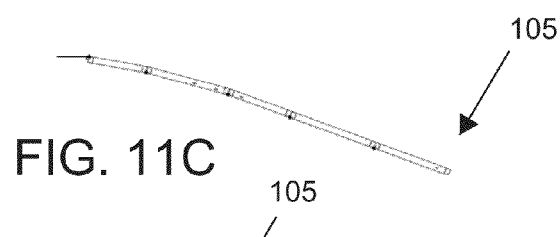
FIG. 11C shows a side view of an alternate embodiment of the panel assembly of the present invention in a third configuration as a ramp structure.
Figure 11D:
FIG. 11D shows a side view of an alternate embodiment of the panel assembly of the present invention in a fourth configuration as a sun shade structure. The panel assembly is held into a static position via the expanding leg.
Figure 11E:
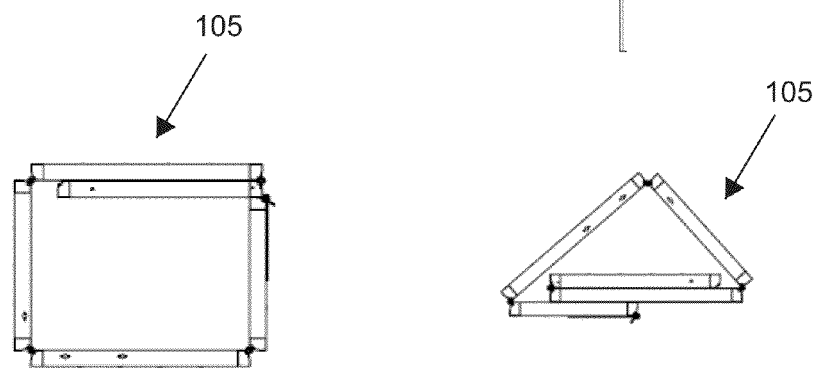
FIG. 11E shows a side view of an alternate embodiment of the panel assembly of the present invention in a fifth configuration as lockable toolbox. The first panel and the fourth panel are lockably attached.
Figure 11F:
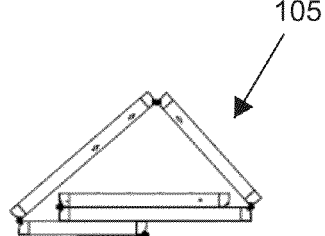
FIG. 11F shows a side view of an alternate embodiment of the panel assembly of the present invention in a sixth configuration as a bed extender. The first panel and the fourth panel overlap and are lockably attached.
Figure 12A:
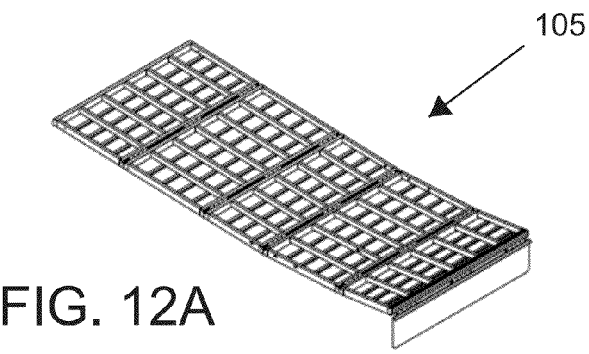
FIG. 12A shows a perspective view of an alternate embodiment of the panel assembly of the present invention in a first configuration as a bed cover structure.
Figure 12B:
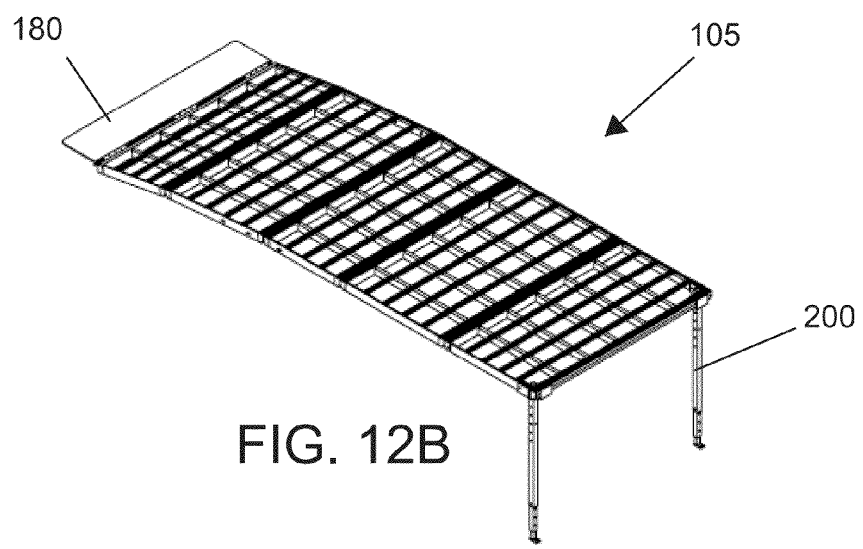
FIG. 12B shows a side view of an alternate embodiment of the panel assembly of the present invention in a second configuration as a work surface structure. The panel assembly is supported by an expanding leg.
Figure 12C:
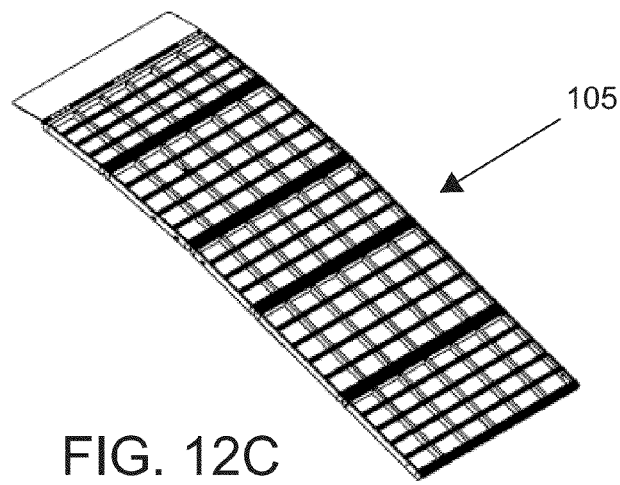
FIG. 12C shows a perspective view of an alternate embodiment of the panel assembly of the present invention in a third configuration as a ramp structure.
Figure 12D:
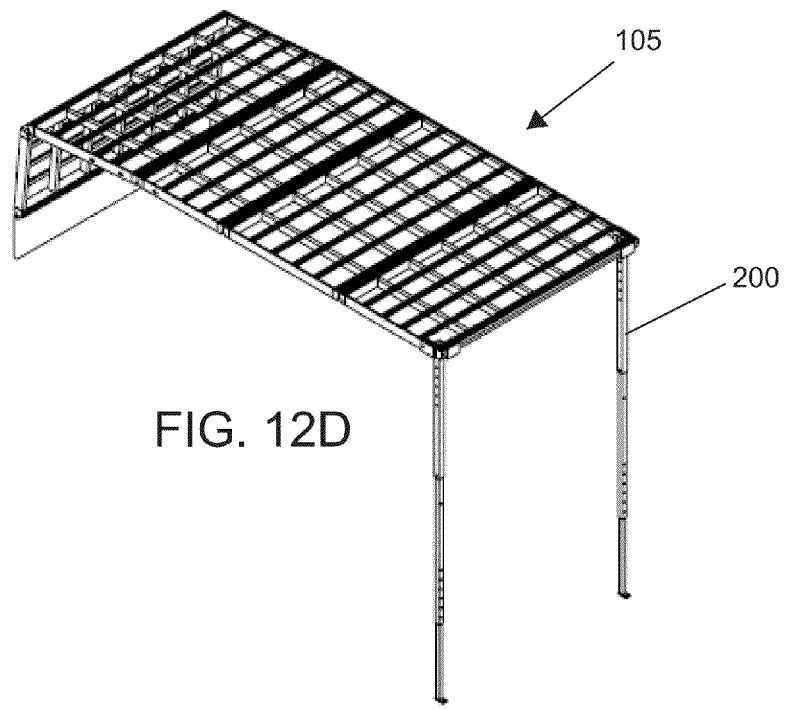
FIG. 12D shows a perspective view of an alternate embodiment of the panel assembly of the present invention in a fourth configuration as a sun shade structure. The panel assembly is supported by an expanding leg.
Figure 12E:
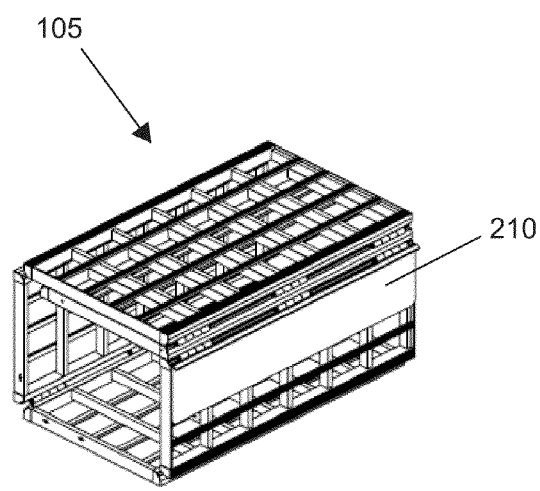
FIG. 12E shows a perspective view of an alternate embodiment of the panel assembly of the present invention in a fifth configuration as lockable toolbox.
Figure 12F:
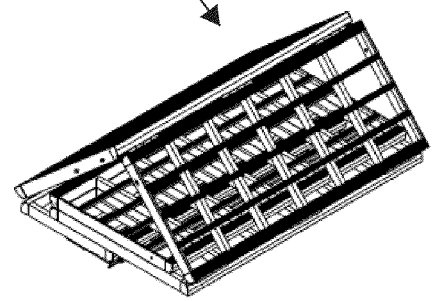
FIG. 12F shows a perspective view of an alternate embodiment of the panel assembly of the present invention in a sixth configuration as a bed extender.
Figure 13:
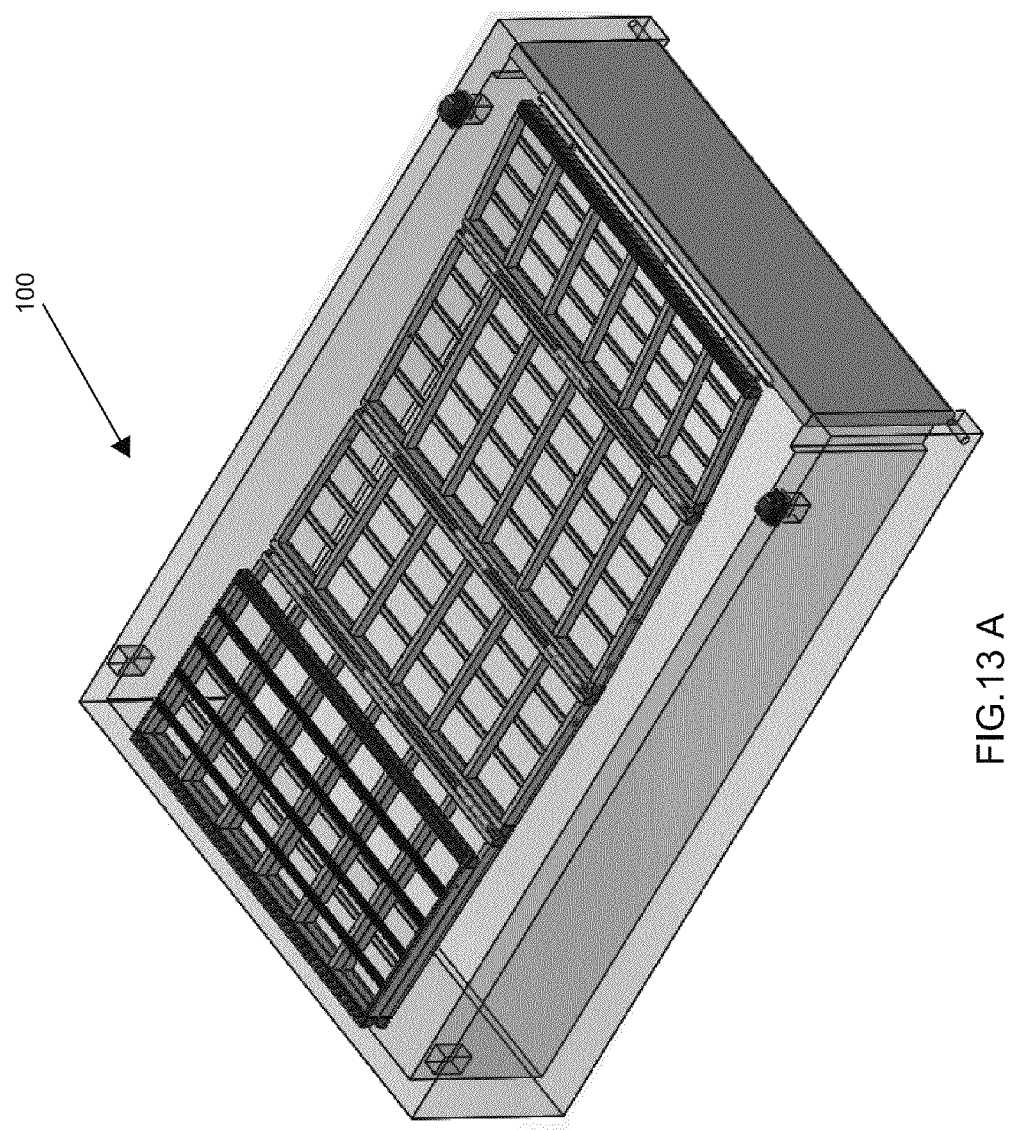
FIG. 13A shows a perspective view of an alternate embodiment of the panel assembly and the pickup bed of the present invention in a first configuration as a bed cover structure.
FIG. 13B shows a side view of an alternate embodiment of the panel assembly and the pickup bed of the present invention in a second configuration as a work surface structure. The panel assembly is supported by an expanding leg.
FIG. 13C shows a perspective view of an alternate embodiment of the panel assembly and the pickup bed of the present invention in a third configuration as a ramp structure.
FIG. 13D shows a perspective view of an alternate embodiment of the panel assembly and the pickup bed of the present invention in a fourth configuration as a sun shade structure. The panel assembly is supported by an expanding leg.
FIG. 13E shows a perspective view of an alternate embodiment of the panel assembly and the pickup bed of the present invention in a fifth configuration as lockable toolbox.
FIG. 13F shows a perspective view of an alternate embodiment of the panel assembly and the pickup bed of the present invention in a sixth configuration as a bed extender.
Figure 13B:
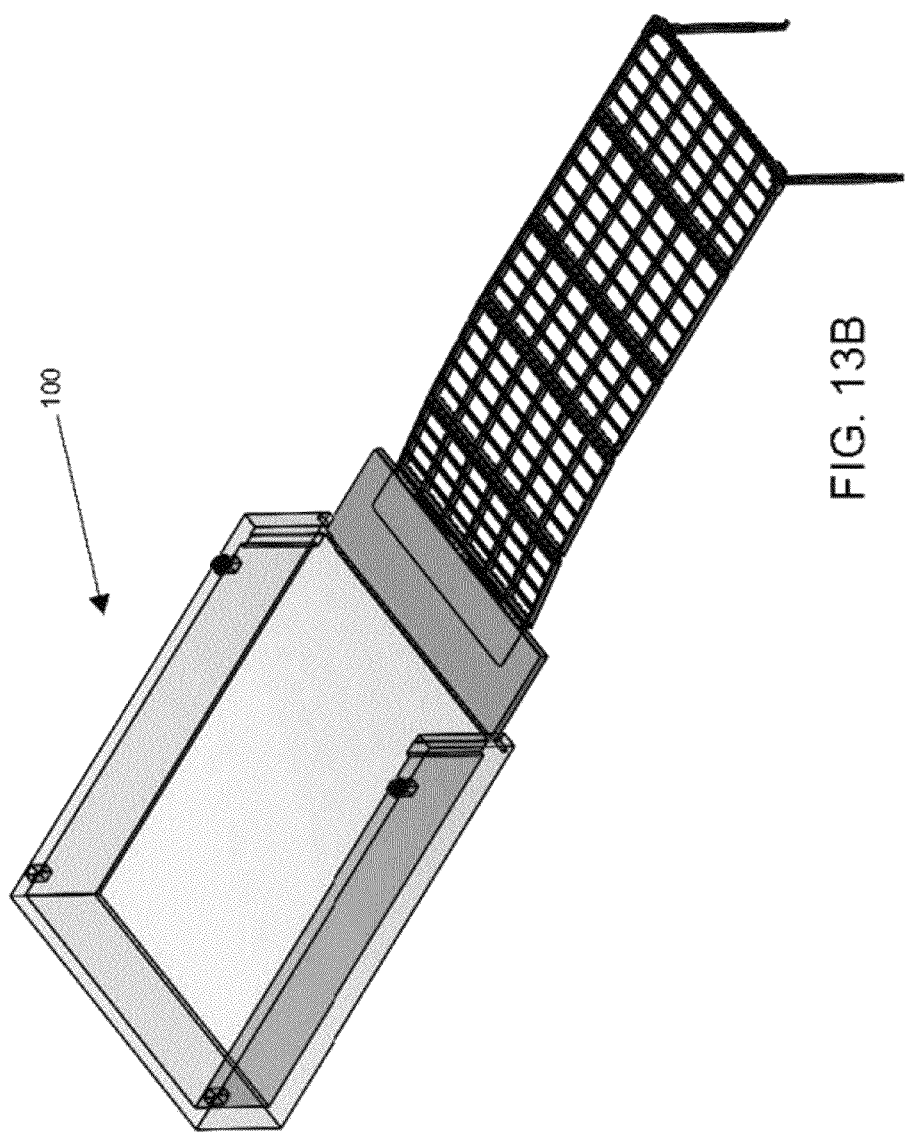
Figure 13C:
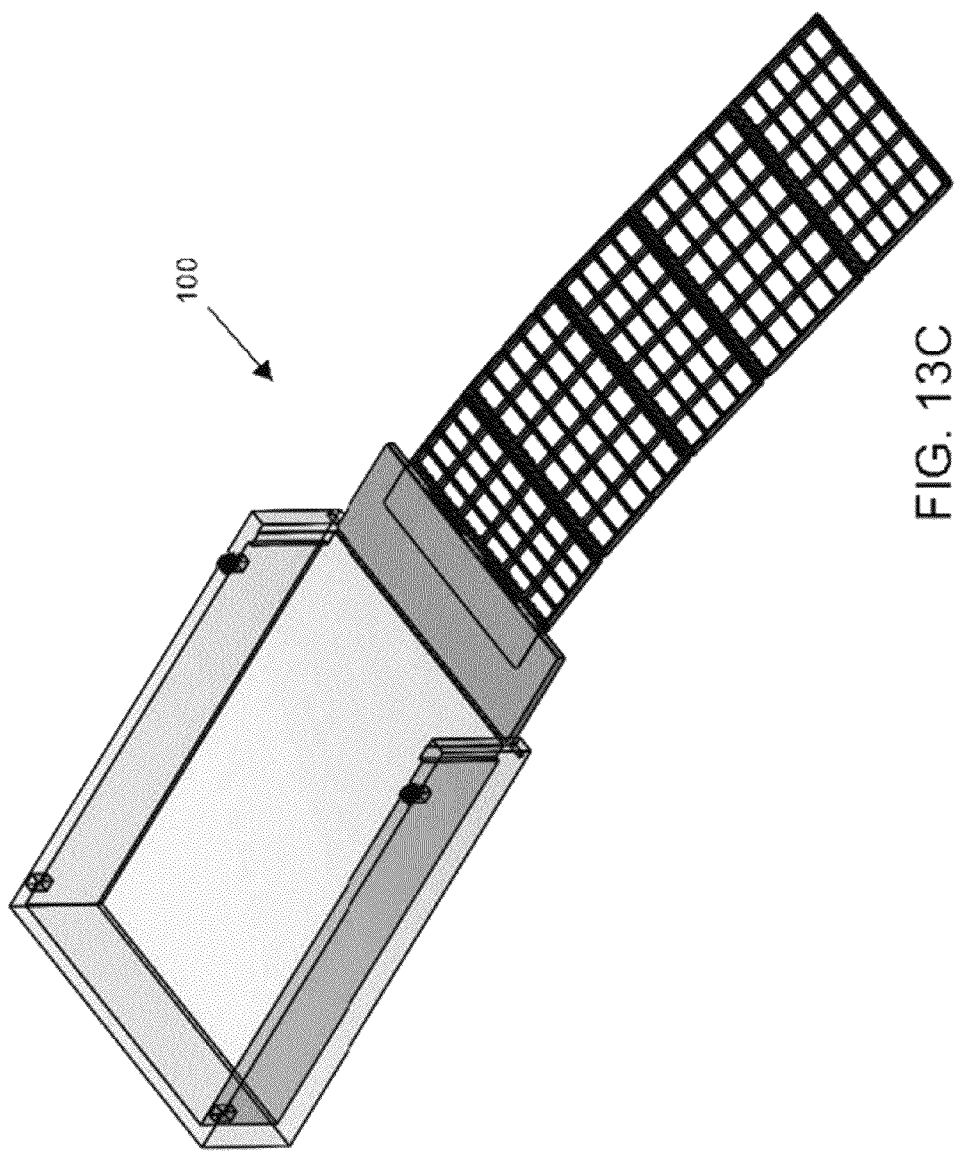
Figure 13E:
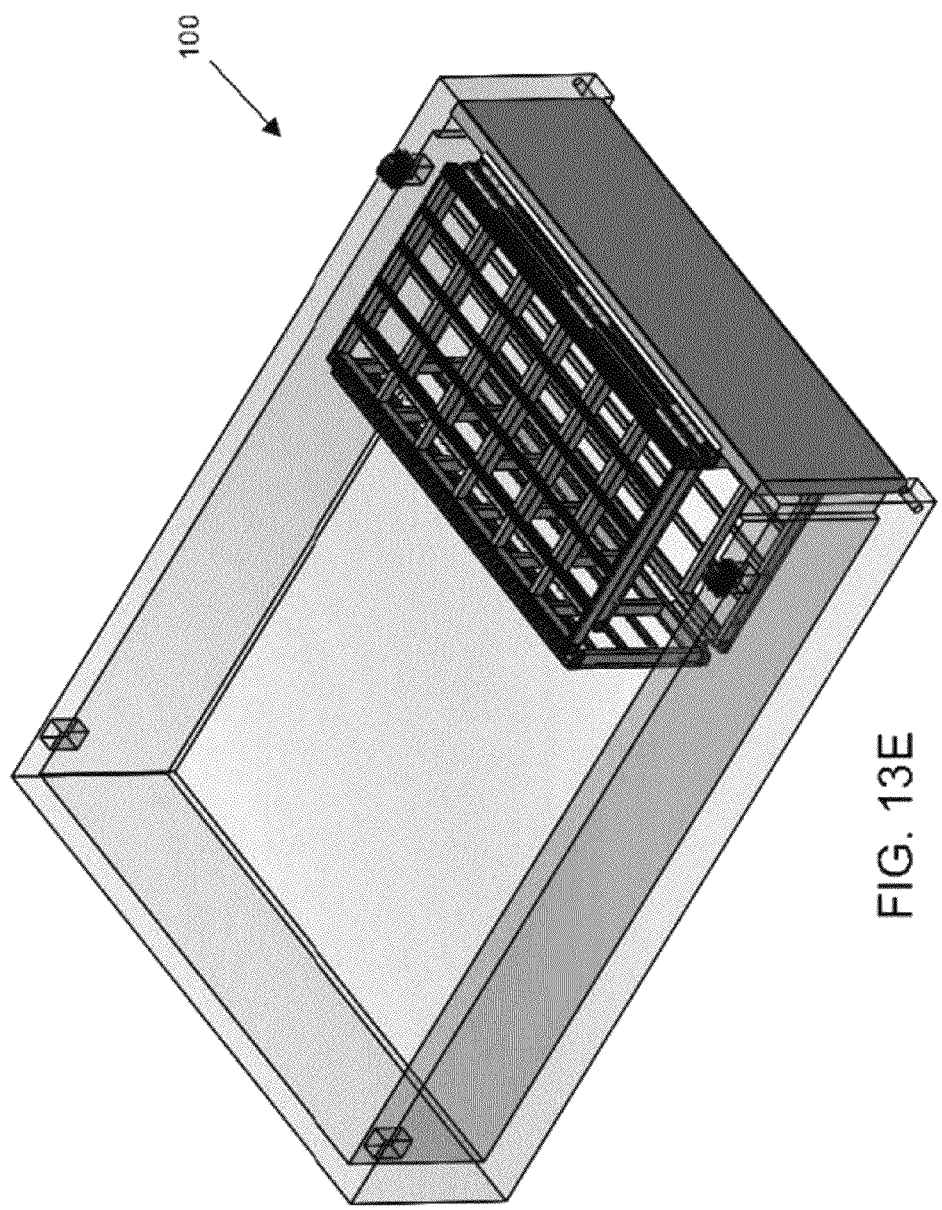

Following is a list of elements corresponding to a particular element referred to herein:

100 Management system
101 Pickup bed
102 Pickup bed top
103 Pickup bed bottom surface
104 Tailgate
105 Panel assembly
110 First panel
111 First panel anterior edge
112 First panel posterior edge
115 First panel length
116 First panel width
120 Second panel
121 Second panel anterior edge
122 Second panel posterior edge
125 Second panel length
126 Second panel width
128 First joint
130 Third panel
131 Third panel anterior edge
132 Third panel posterior edge
135 Third panel length
136 Third panel width
138 Second joint
140 Fourth panel
141 Fourth panel anterior edge
142 Fourth panel posterior edge
145 Fourth panel length
146 Fourth panel width
148 Third joint
150 First hinge component
160 Second hinge component
170 Extrusion
171 Extrusion top surface
172 Ridge
180 Strap lock
181 Strap lock anchor
182 Strap cinch
183 Pivot screw
185 Release lever
186 Locking cover
190 Panel
191 Panel first side
192 Panel second side
200 Expanding leg
210 Attachment panel Referring now to FIG. 1-14B, the present invention features a configurable pickup bed utility management system (100) for enhancing functionality of a pickup bed (101). In some embodiments, the system (100) comprises a pickup bed (101).

In some embodiments, the pickup bed (101) is a standard pickup bed (101) typically found as original equipment on a production ½ ton, ¾ ton, or 1 ton pickup truck having a planar pickup bed bottom surface (103) and rails or bed sides perpendicularly located on the bed (101) with respect to the pickup bed bottom surface (103). In some embodiments, the pickup bed (101) is fully open at a pickup bed top (102) and a pickup bed back. In some embodiments, a tailgate (104) is pivotally located at the pickup bed back.

In some embodiments, the pickup bed (101) is a pickup bed (101) manufactured as aftermarket equipment for a production ½ ton, ¾ ton, or 1 ton pickup truck having a planar pickup bed bottom surface (103) and no rails or bed sides perpendicularly located on the bed (101) with respect to the pickup bed bottom surface (103). In some embodiments, the bed bottom surface (103) has stake pockets for insertion of stakes, rails or bed sides. In some embodiments, the pickup bed (101) is a flat bed.

In some embodiments, the pickup bed (101) is a pickup bed (101) manufactured as aftermarket equipment for a production ½ ton, ¾ ton, or 1 ton pickup truck having a planar pickup bed bottom surface (103) and rails or bed sides perpendicularly located on the bed (101) with respect to the pickup bed bottom surface (103). In some embodiments, the pickup bed (101) is a utility bed.

In some embodiments, the pickup bed (101) is a part of a body of a van. In some embodiments, the pickup bed (101) is a trailer.

In some embodiments, the system (100) comprises a segmented panel assembly (105).

In some embodiments, the segmented panel assembly (105) comprises a planar first panel (110) having a first panel length (115) and a first panel width (116). In some embodiments, the first panel (110) comprises a first panel anterior edge (111) and a first panel posterior edge (112). In some embodiments, the first panel length (115) is measured from the first panel anterior edge (111) to the first panel posterior edge (112). In some embodiments, a first hinge component (150) is located on the first panel anterior edge (111). In some embodiments, a second hinge component (160) is located on the first panel posterior edge (112).

In some embodiments, the first panel length (115) is 18.5". In some embodiments, the first panel length (115) is between 12" and 16". In some embodiments, the first panel length (115) is between 16" and 18". In some embodiments, the first panel length (115) is between 18" and 20". In some embodiments, the first panel length (115) is between 20" and 24". In some embodiments, the first panel length (115) is less than 12". In some embodiments, the first panel length (115) is greater than 24".

In some embodiments, the segmented panel assembly (105) comprises
a planar second panel (120) having a second panel length (125) and a second panel width (126). In some embodiments, the second panel length (125) is greater than the first panel length (115). In some embodiments, the second panel (120) comprises a second panel anterior edge (121) and a second panel posterior edge (122). In some embodiments, the second panel length (125) is measured from the second panel anterior edge (121) to the second panel posterior edge (122). In some embodiments, a first hinge component (150) is located on the second panel anterior edge (121). In some embodiments, a second hinge component (160) is located on the second panel posterior edge (122).

In some embodiments, the second panel (120) is located on the first panel (110) via the first hinge component (150) of the second panel (120) pivotally connecting to the second hinge component (160) of the first panel (110). In some embodiments, a first joint (128) range of motion is between about 0 and an angle less than about 180 degrees. In some embodiments, upon full extension, the first panel (110) and the second panel (120) never lie on the same plane.

In some embodiments, the second panel (120) is removable from the first panel (110). In some embodiments, the first joint (128) range of motion is between about 0 and 175 degrees. In some embodiments, the first joint (128) range of motion is between about 0 and 178 degrees. In some embodiments, the first joint (128) range of motion is between about 0 and 176 degrees. In some embodiments, the first joint (128) range of motion is between about 0 and 174 degrees. In some embodiments, the first joint (128) range of motion is between about 0 and 172 degrees. In some embodiments, the first joint (128)

range of motion is between about 0 and 170 degrees. In some embodiments, the first joint (128) range of motion is between about 0 and 165 degrees. In some embodiments, the first joint (128) range of motion is between about 0 and 160 degrees. In some embodiments, the first joint (128) range of motion is between about 0 and 155 degrees. In some embodiments, the first joint (128) range of motion is between about 0 and 150 degrees.

In some embodiments, the second panel length (125) is about 26.5". In some embodiments, the second panel length (125) is between about 20" and 24". In some embodiments, the second panel length (125) is between about 24" and 26". In some embodiments, the second panel length (125) is between about 26" and 28". In some embodiments, the second panel length (125) is between about 28" and 32". In some embodiments, the second panel length (125) is less than about 20". In some embodiments, the second panel length (125) is greater than about 32".

In some embodiments, the segmented panel assembly (105) comprises a planar third panel (130) having a third panel length (135) and a third panel width (136). In some embodiments, the third panel length (135) is equal to the first panel length (115). In some embodiments, the third panel (130) comprises a third panel anterior edge (131) and a third panel posterior edge (132). In some embodiments, the third panel length (135) is measured from the third panel anterior edge (131) to the third panel posterior edge (132). In some embodiments, a first hinge component (150) is located on the third panel anterior edge (131). In some embodiments, a second hinge component (160) is located on the third panel posterior edge (132).

In some embodiments, the third panel (130) is located on the second panel (120) via the first hinge component (150) of the third panel (130) pivotally connecting to the second hinge component (160) of the second panel (120). In some embodiments, a second joint (138) range of motion is between 0 and an angle less than 180 degrees. In some embodiments, upon full extension, the second panel (120) and the third panel (130) never lie on the same plane.

In some embodiments, the third panel (130) is removable from the second panel (120). In some embodiments, the second joint (138) range of motion is between about 0 and 175 degrees. In some embodiments, the second joint (138) range of motion is between about 0 and 178 degrees. In some embodiments, the second joint (138) range of motion is between about 0 and 176 degrees. In some embodiments, the second joint (138) range of motion is between about 0 and 174 degrees. In some embodiments, the second joint (138) range of motion is between about 0 and 172 degrees. In some embodiments, the second joint (138) range of motion is between about 0 and 170 degrees. In some embodiments, the second joint (138) range of motion is between about 0 and 165 degrees. In some embodiments, the second joint (138) range of motion is between about 0 and 160 degrees. In some embodiments, the second joint (138) range of motion is between about 0 and 155 degrees. In some embodiments, the second joint (138) range of motion is between about 0 and 150 degrees.

In some embodiments, the third panel length (135) is about 18.5". In some embodiments, the third panel length (135) is between about 12" and 16". In some embodiments, the third panel length (135) is between about 16" and 18". In some embodiments, the third panel length (135) is between about 18" and 20". In some embodiments, the third panel length (135) is between about 20" and 24". In some embodiments, the third panel length (135) is less than about 12". In some embodiments, the third panel length (135) is greater than about 24".

In some embodiments, the segmented panel assembly (105) comprises a planar fourth panel (140) having a fourth panel length (145) and a fourth panel width (146). In some embodiments, the fourth panel length (145) is greater than the first panel length (115). In some embodiments, the fourth panel length (145) is greater than the second panel length (125). In some embodiments, the fourth panel length (145) is greater than the third panel length (135). In some embodiments, the fourth panel (140) comprises a fourth panel anterior edge (141) and a fourth panel posterior edge (142). In some embodiments, the fourth panel length (145) is measured from the fourth panel anterior edge (141) to the fourth panel posterior edge (142). In some embodiments, a first hinge component (150) is located on the fourth panel anterior edge (141). In some embodiments, a second hinge component (160) is not located on the first panel posterior edge (112).

In some embodiments, the fourth panel (140) is located on the third panel (130) via the first hinge component (150) of the fourth panel (140) pivotally connecting to the second hinge component (160) of the third panel (130). In some embodiments, a third joint (148) range of motion is between 0 and 180 degrees. In some embodiments, upon full extension, the third panel (130) and the fourth panel (140) lie on the same plane.

In some embodiments, the fourth panel (140) is removable from the third panel (130).

In some embodiments, the fourth panel length (145) is about 27.8". In some embodiments, the fourth panel length (145) is between about 20" and 24". In some embodiments, the fourth panel length (145) is between about 24" and 26". In some embodiments, the fourth panel length (145) is between about 26" and 28". In some embodiments, the fourth panel length (145) is between about 28" and 32". In some embodiments, the fourth panel length (145) is less than about 20". In some embodiments, the fourth panel length (145) is greater than about 32".

In some embodiments, the lengths of each panel relative to the other panels is critical to the novelty and function of the present invention. In some embodiments, the range of motion of each joint relative to the other joints is critical to the novelty and function of the present invention.

In some embodiments, the first panel (110), the second panel (120), the third panel (130), and the fourth panel (140) are hereinafter collectively referred to as panels (190) each having a panel first side (191) and a panel second side (192). In some embodiments, the first panel width (116), the second panel width (126), the third panel width (136), and the fourth panel width (146) are equal. In some embodiments, the first panel width (116), the second panel width (126), the third panel width (136), and the fourth panel width (146) are 47". In some embodiments, the first panel width (116), the second panel width (126), the third panel width (136), and the fourth panel width (146) are 48". In some embodiments, the first panel width (116), the second panel width (126), the third panel width (136), and the fourth panel width (146) are between 40" and 48". In some embodiments, the first panel width (116), the second panel width (126), the third panel width (136), and the fourth panel width (146) are between 36" and 40". In some embodiments, the first panel width (116), the second panel width (126), the third panel width (136), and the fourth panel width (146) are smaller than 36". In some embodiments, the first panel width (116), the second panel width (126), the third panel width (136), and the fourth panel width (146) are between 48" and 54". In some embodiments, the first panel width (116), the second panel width (126), the third panel width (136), and the fourth panel width (146) are between 54" and 60". In some embodiments, the first panel width (116), the second panel width (126), the third panel width (136), and the fourth panel width (146) are greater than 60".

In some embodiments, the first panel width (116), the second panel width (126), the third panel width (136), and the fourth panel width (146) are about 24". In some embodiments, this is an optimal width for use with motorcycles. In some embodiments, the first panel width (116), the second panel width (126), the third panel width (136), and the fourth panel width (146) are about 60". In some embodiments, the attachment panel width is equal to the first panel width (116), the second panel width (126), the third panel width (136), and the fourth panel width.

In some embodiments, a plurality of linear extrusions (170) are located on the panels (190) from the panel first side (191) to the panel second side (192). In some embodiments, each extrusion (170) comprises a plurality of linear ridges (172) located on a convexly curved extrusion top surface (171) thereon. In some embodiments, each ridge (172) comprises a linear valley between the ridge (172) and another ridge (172). In some embodiments, each ridge (172) comprises a shape of an inverted "V". In some embodiments, each valley comprises a shape of a "V". In some embodiments, the extrusions (170) provide support and rigidity to the panel (190). In some embodiments, the extrusions (170) provide a gripping surface when the panel assembly (105) is used as a ramp structure. In some embodiments two linear extrusions (170) are located on a panel (190). In some embodiments three linear extrusions (170) are located on a panel (190). In some embodiments four linear extrusions (170) are located on a panel (190). In some embodiments five linear extrusions (170) or more are located on a panel (190).

In some embodiments, the ridge (172) comprises a sharp edge. In some embodiments, the valley comprises a sharp corner. In some embodiments, each extrusion comprises 12 ridges (172) located on the convexly curved extrusion top surface (171).

In some embodiments, the panel assembly (105) is pivotally located on the pickup bed (101).

In some embodiments, in a first configuration, the panel assembly (105) is fully extended over the pickup bed (101) forming a bed cover structure to cover an open pickup bed top (102). In some embodiments, the panel assembly (105) is supported over the open pickup bed top (102). In some embodiments, the panel assembly (105) is supported over the open pickup bed top (102) by a bed rail of the pickup bed (101). In some embodiments, the panel assembly (105) is supported over the open pickup bed top (102) by a bracket or a support leg mounted on the pickup bed (101).

In some embodiments, in a second configuration, the panel assembly (105) is fully extended posterior to the pickup bed (101) forming a work surface structure. In some embodiments, the panel assembly (105) is supported via one or more expanding legs (200) located on the panel assembly (105) and extending to a ground surface. In some embodiments, the work surface structure is covered by a solid material for use as a bench top.

In some embodiments, in a third configuration, the panel assembly (105) is fully extended posterior to the pickup bed (101) forming a ramp structure. In some embodiments, the panel assembly (105) is supported via the fourth panel posterior edge (142) located on the ground surface.

In some embodiments, in a fourth configuration, the panel assembly (105) is partially extended posterior to the pickup bed (101) forming a sun shade structure. In some embodiments, the first panel (110) is located angularly with respect to the second panel (120), the third panel (130), and the fourth panel (140). In some embodiments, the panel assembly (105) is supported via one or more expanding legs (200) located on the panel assembly (105) and extending to a ground surface. In some embodiments, the panel assembly (105) is covered by a tarp or a panel supported by the panel assembly (105) for use as a sun shade.

In some embodiments, in a fifth configuration, the panel assembly (105) is folded into the pickup bed (101) forming a lockable toolbox. In some embodiments, each panel (190) is located angularly with respect to an adjoining panel (190). In some embodiments, the panel assembly (105) rests on a planar pickup bed bottom surface (103). In some embodiments, the pickup bed sides may obstruct any open ends of the panel assembly (105) in the fifth configuration. In some embodiments, the first panel (110) may be locked to the fourth panel (140) to secure the panel assembly (105) in the fifth configuration.

In some embodiments, in a sixth configuration, the panel assembly (105) is folded into the pickup bed (101) forming a bed extender. In some embodiments, each panel (190) is located angularly with respect to an adjoining panel (190). In some embodiments, the first panel (110) and the fourth panel (140) overlap. In some embodiments, the panel assembly (105) rests on a planar pickup bed bottom surface (103). In some embodiments, the first panel (110) may be attached to the fourth panel (140) to secure the panel assembly (105) in the sixth configuration.

In some embodiments, the panel (190) comprises a grid structure. In some embodiments, the panel (190) comprises a grid structure.

STRAP LOCK DETAIL: In some embodiments, the panel assembly (105) comprises a lockable pivoting strap lock (180). In some embodiments, a strap lock anchor (181) is attached to a stake pocket of the pickup bed (101). Stake pockets are well known to those of ordinary skill in the art. In some embodiments, stake pockets are rectangular and comprise a depth. In some embodiments, stake pockets comprise a lip that surrounds an opening of the stake pocket. In some embodiments, the strap lock anchor (181) comprises an assembly with a bottom component that slides into the stake pocket and a top component that sets on top of the stake pocket. In some embodiments, the strap lock anchor (181) is held into position via the bottom component clamping against the top component in the stake pocket.

In some embodiments, a spring-biased strap cinch (182) is pivotally located on the strap lock anchor (181) via a pivot screw (183). In some embodiments, the pivot screw (183) is clamped down to keep the strap cinch (182) affixed into position from rotation. In some embodiments, the pivot screw (183) is loosed to position the strap cinch (182) toward a load to provide an optimal angle for cinching a strap. In some embodiments, the pivot screw (183) is tightened once the strap cinch (182) is optimally positioned toward a load to provide an optimal angle for cinching a strap. In some embodiments, the pivot screw (183) securely holds the strap cinch onto the strap lock anchor (183) but does not affix the strap cinch (182) at a specific angle; the strap cinch (182) in this case is allowed to freely rotate.

In some embodiments, a strap is located through the strap cinch (182), drawn tight, and held in place via the strap cinch (182). In some embodiments, the strap cinch (182) is releasable and able to be pulled in or out via depressing a release lever (185). In some embodiments, once the release lever (185) is released, if a strap is in the strap cinch (182), it is securely retained. In some embodiments, the strap is released by depressing the release lever.

In some embodiments, a locking cover (186) is located over a strap cinch (182) for lockably securing the strap lock (180). In some embodiments, the locking cover (186) lockably engages a static component of the strap cinch (182). In some embodiments, the locking cover (186) is generally hollow having one or more sides open. In some embodiments, with the locking cover (186) secured, the strap cinch (182) cannot be accessed, therefore the strapped load is lockably secured.

In some embodiments, the panel assembly (105) is pivotally located on a tailgate (104) of the pickup bed (101). In some embodiments, the panel assembly (105) is pivotally located on a top edge of the tailgate (104) of the pickup bed (101). In some embodiments, the panel assembly (105) is pivotally located on a terminating end of the pickup bed (101).

In an alternate embodiment, the present invention features a segmented panel assembly (105) for enhancing functionality of a pickup bed (101). In some embodiments, the assembly (105) comprises a planar first panel (110) having a first panel length (115) and a first panel width (116). In some embodiments, the first panel (110) comprises a first panel anterior edge (111) and a first panel posterior edge (112). In some embodiments, the first panel length (115) is measured from the first panel anterior edge (111) to the first panel posterior edge (112). In some embodiments, a first hinge component (150) is located on the first panel anterior edge (111). In some embodiments, a second hinge component (160) is located on the first panel posterior edge (112).

In some embodiments, the first panel (110) is located on a pickup bed (101) via the first hinge component (150) of the first panel (110) pivotally connecting to a second hinge component (160) of the pickup bed (101).

In some embodiments, the assembly (105) comprises a planar second panel (120) having a second panel length (125) and a second panel width (126). In some embodiments, the second panel length (125) is greater than the first panel length (115). In some embodiments, the second panel (120) comprises a second panel anterior edge (121) and a second panel posterior edge (122). In some embodiments, the second panel length (125) is measured from the second panel anterior edge (121) to the second panel posterior edge (122). In some embodiments, a first hinge component (150) is located on the second panel anterior edge (121). In some embodiments, a second hinge component (160) is located on the second panel posterior edge (122).

In some embodiments, the second panel (120) is located on the first panel (110) via the first hinge component (150) of the second panel (120) pivotally connecting to the second hinge component (160) of the first panel (110). In some embodiments, a first joint (128) range of motion is between about 0 and an angle less than 180 degrees. In some embodiments, upon full extension, the first panel (110) and the second panel (120) never lie on the same plane.

In some embodiments, the assembly (105) comprises a planar third panel (130) having a third panel length (135) and a third panel width (136). In some embodiments, the third panel length (135) is equal to the first panel length (115). In some embodiments, the third panel (130) comprises a third panel anterior edge (131) and a third panel posterior edge (132). In some embodiments, the third panel length (135) is measured from the third panel anterior edge (131) to the third panel posterior edge (132). In some embodiments, a first hinge component (150) is located on the third panel anterior edge (131). In some embodiments, a second hinge component (160) is located on the third panel posterior edge (132).

In some embodiments, the third panel (130) is located on the second panel (120) via the first hinge component (150) of the third panel (130) pivotally connecting to the second hinge component (160) of the second panel (120). In some embodiments, a second joint (138) range of motion is between 0 and an angle less than about 180 degrees. In some embodiments, upon full extension, the second panel (120) and the third panel (130) never lie on the same plane.

In some embodiments, the assembly (105) comprises a planar fourth panel (140) having a fourth panel length (145) and a fourth panel width (146). In some embodiments, the fourth panel length (145) is greater than the first panel length (115). In some embodiments, the fourth panel (140) comprises a fourth panel anterior edge (141) and a fourth panel posterior edge (142). In some embodiments, the fourth panel length (145) is measured from the fourth panel anterior edge (141) to the fourth panel posterior edge (142). In some embodiments, a first hinge component (150) is located on the fourth panel anterior edge (141). In some embodiments, a second hinge component (160) is not located on the first panel posterior edge (112).

In some embodiments, the fourth panel (140) is located on the third panel (130) via the first hinge component (150) of the fourth panel (140) pivotally connecting to the second hinge component (160) of the third panel (130). In some embodiments, a third joint (148) range of motion is between about 0 and 180 degrees. In some embodiments, upon full extension, the third panel (130) and the fourth panel (140) lie on the same plane.

In some embodiments, the first panel (110), the second panel (120), the third panel (130), and the fourth panel (140) are hereinafter collectively referred to as panels (190) each having a panel first side (191) and a panel second side (192). In some embodiments, the first panel width (116), the second panel width (126), the third panel width (136), and the fourth panel width (146) are equal.

In some embodiments, a plurality of linear extrusions (170) are located on the panels (190) from the panel first side (191) to the panel second side (192). In some embodiments, each extrusion (170) comprises a plurality of ridges (172) located on a convexly curved extrusion top surface (171) thereon. In some embodiments, each ridge (172) comprises a shape of an inverted "V".

In some embodiments, the panel assembly (105) is pivotally located on the pickup bed (101).

In some embodiments, in a first configuration, the panel assembly (105) is fully extended over the pickup bed (101) forming a bed cover structure to cover an open pickup bed top (102). In some embodiments, the panel assembly (105) is supported over the open pickup bed top (102).

In some embodiments, in a second configuration, the panel assembly (105) is fully extended posterior to the pickup bed (101) forming a work surface structure. In some embodiments, the panel assembly (105) is supported via one or more expanding legs (200) located on the panel assembly (105) and extending to a ground surface.

In some embodiments, in a third configuration, the panel assembly (105) is fully extended posterior to the pickup bed (101) forming a ramp structure. In some embodiments, the panel assembly (105) is supported via the fourth panel posterior edge (142) located on the ground surface.

In some embodiments, in a fourth configuration, the panel assembly (105) is partially extended posterior to the pickup bed (101) forming a sun shade structure. In some embodiments, the first panel (110) is located angularly with respect to the second panel (120), the third panel (130), and the fourth panel (140). In some embodiments, the panel assembly (105) is supported via one or more expanding legs (200) located on the panel assembly (105) and extending to a ground surface.

In some embodiments, in a fifth configuration, the panel assembly (105) is folded into the pickup bed (101) forming a lockable toolbox. In some embodiments, each panel (190) is located angularly with respect to an adjoining panel (190). In some embodiments, the panel assembly (105) rests on a planar pickup bed bottom surface (103).

In some embodiments, in a sixth configuration, the panel assembly (105) is folded into the pickup bed (101) forming a bed extender. In some embodiments, each panel (190) is located angularly with respect to an adjoining panel (190). In some embodiments, the first panel (110) and the fourth panel (140) overlap. In some embodiments, the panel assembly (105) rests on a planar pickup bed bottom surface (103).

In an alternate embodiment, the present invention features a segmented panel assembly (105) comprising a first panel (110). In some embodiments, the segmented panel assembly (105) comprises a second panel (120). In some embodiments, the second panel (120) is pivotally located on the first panel (110). In some embodiments, the segmented panel assembly (105) comprises a third panel (130). In some embodiments, the third panel (130) is pivotally located on the second panel (120). In some embodiments, the segmented panel assembly (105) comprises a fourth panel (140). In some embodiments, the fourth panel (140) is pivotally located on the third panel (130).

In some embodiments, the first panel (110), the second panel (120), the third panel (130), and the fourth panel (140) are hereinafter collectively referred to as panels (190). In some embodiments, a plurality of linear extrusions (170) are located on the panels (190).

In some embodiments, in a first configuration, the panel assembly (105) is fully extended over a pickup bed (101) forming a bed cover structure to cover an open pickup bed top (102). In some embodiments, in a second configuration, the panel assembly (105) is fully extended posterior to the pickup bed (101) forming a work surface structure. In some embodiments, in a third configuration, the panel assembly (105) is fully extended posterior to the pickup bed (101) forming a ramp structure. In some embodiments, in a fourth configuration, the panel assembly (105) is partially extended posterior to the pickup bed (101) forming a sun shade structure. In some embodiments, in a fifth configuration, the panel assembly (105) is folded into the pickup bed (101) forming a lockable toolbox. In some embodiments, in a sixth configuration, the panel assembly (105) is folded into the pickup bed (101) forming a bed extender.

In some embodiments, in a fourth configuration, the panel assembly (105) is partially extended posterior to the pickup bed (101) forming a sun shade structure. In some embodiments, the first panel (110) and the second panel (120) are set at an angle with respect to one another. In some embodiments, the angle is about 95 degrees.

In some embodiments, the panel assembly (105) is pivotally located on a tailgate (104) of the pickup bed (101) via a pivoting attachment panel. In some embodiments, the planar attachment panel (210) has an attachment panel length and an attachment panel width. In some embodiments, the attachment panel (210) comprises an attachment panel anterior edge and an attachment panel posterior edge. In some embodiments, the attachment panel length is measured from the attachment panel anterior edge to the attachment panel posterior edge. In some embodiments, a second hinge component (160) is located on the attachment panel posterior edge. In some embodiments, the attachment panel (110) is located on the tailgate (104) of the pickup bed (101). In some embodiments, the panel assembly is pivotally located on the tailgate (104) of the pickup bed (101) via the first hinge component (150) of the first panel (110) pivotally connecting to the second hinge component (160) of the attachment panel (210).

In some embodiments, the panel assembly (105) is pivotally located on the pickup bed (101) via a pivoting attachment panel. In some embodiments, the planar attachment panel (210) has an attachment panel length and an attachment panel width. In some embodiments, the attachment panel (210) comprises an attachment panel anterior edge and an attachment panel posterior edge. In some embodiments, the attachment panel length is measured from the attachment panel anterior edge to the attachment panel posterior edge. In some embodiments, a second hinge component (160) is located on the attachment panel posterior edge. In some embodiments, the attachment panel (110) is located on the pickup bed posterior edge. In some embodiments, the panel assembly is pivotally located on the pickup bed posterior edge via the first hinge component (150) of the first panel (110) pivotally connecting to the second hinge component (160) of the attachment panel (210).

In some embodiments, the present invention features a segmented panel assembly (105) comprising a plurality of panels (190) pivotally located in a series. In some embodiments, upon full extension, all panels never lie on a single plane. In some embodiments, upon full extension, at least a portion of the panel assembly (105) is non-linear.

In some embodiments, in a first configuration, the panel assembly (105) is fully extended over a pickup bed (101) forming a bed cover structure to cover an open pickup bed top (102). In some embodiments, in a second configuration, the panel assembly (105) is fully extended posterior to the pickup bed (101) forming a work surface structure. In some embodiments, in a third configuration, the panel assembly (105) is fully extended posterior to the pickup bed (101) forming a ramp structure. In some embodiments, in a fourth configuration, the panel assembly (105) is partially extended posterior to the pickup bed (101) forming a sun shade structure. In some embodiments, in a fifth configuration, the panel assembly (105) is folded into the pickup bed (101) forming a lockable toolbox. In some embodiments, in a sixth configuration, the panel assembly (105) is folded into the pickup bed (101) forming a bed extender.

HINGE COMPONENT DETAIL: In some embodiments, the first hinge component (150) and the second hinge component (160) are identical and known as hinge components. In some embodiments, the first hinge component (150) is located opposed to the second hinge component (160) on a separate entity. In some embodiments, each hinge component comprises a cylindrical tube having a first longitudinal ear and a second longitudinal ear intersectingly positioned in a tube sidewall. In some embodiments, a "V" shaped groove is located between the ears. In some embodiments, the ears are angularly positioned with respect to one another and are not parallel. In some embodiments, the angle of positioning of the ears with respect to one another is between about 0 and 180 degrees. In some embodiments, the angle of positioning of the ears with respect to one another is about 30 degrees. In some embodiments, the angle of positioning of the ears with respect to one another is about 45 degrees. In some embodiments, the angle of positioning of the ears with respect to one another is about 60 degrees. In some embodiments, the angle of positioning of the ears with respect to one another is about 75 degrees. In some embodiments, the angle of positioning of the ears with respect to one another is about 90 degrees. In some embodiments, the angle of positioning of the ears with respect to one another is about 105 degrees. In some embodiments, the angle of positioning of the ears with respect to one another is about 120 degrees.

In some embodiments, the first hinge component (150) and the second hinge component (160) are placed at a corner of each panel (190). In some embodiments, the first hinge component (150) and the second hinge component (160) are placed at an edge of each panel (190).

In some embodiments, each longitudinal ear (that is located parallel the tube sidewall) comprises a flared, bulbous terminating end. In some embodiments, the flared, bulbous terminating end runs the length of each longitudinal ear.

PANEL EDGE DETAIL: In some embodiments, each panel (190) comprises an edge, for example, the first panel anterior edge (111), the first panel posterior edge (112), the second panel anterior edge (121), the second panel posterior edge (122), the third panel anterior edge (131), the third panel posterior edge (132), the fourth panel anterior edge (141), and the fourth panel posterior edge (142). In some embodiments, each panel edge comprises an extrusion having a groove located on a corner edge. In some embodiments, the groove is mated to fit the pair of longitudinal ears on the hinges. In some embodiments, the longitudinal ears on the hinge slide into the groove where the hinge can be positioned and welded into place. In some embodiments, the feature of the groove and ears for hinge positioning is critical to the novelty of the present invention as it creates accurate positioning and a stronger weld.

In some embodiments, each panel edge comprises an extrusion. In some embodiments, each extrusion comprises a generally rectangular cross section. In some embodiments, each extrusion comprises a terminating edge disposed at an angle with respect to the edge that adjoins the panel. In some embodiments, the angle is about 2½ degrees. In some embodiments, the angle is about 5 degrees. In some embodiments, the angle is about 0 degrees.

ADDITIONAL PANELS: In some embodiments, the panel assembly (105) comprises an additional panel (190), for example, a five panel assembly (105). In some embodiments, for the fifth and sixth configurations, additional panels (190) overlap. In some embodiments, the panel assembly (105) comprises a plurality of additional panels (190). In some embodiments, additional panels are connected using additional alternating first hinge components (150) and second hinge components (160). In some embodiments, multiple first hinge components (150) are used on each edge. In some embodiments, multiple second hinge components (160) are used on each edge.

In some embodiments, one or more of the first panel (110), the second panel (120), the third panel (130) or the fourth panel (140) may be divided up in to additional panels.

ATTACHMENT PANEL: In some embodiments, the attachment panel (210) is planar. In some embodiments, the attachment panel (210) is rectangular. In some embodiments, the attachment panel (210) comprises a mounting aperture. In some embodiments, the attachment panel (210) comprises a tailgate cap that slips over an edge of the tailgate. In some embodiments, the attachment panel is bolted to the inside surface of the tailgate. One end of the attachment panel is bent about 126 degrees and the edge of the bent part rests on the top edge of the tailgate. In some embodiments, the range of motion for an attachment panel joint ranges from 0 to about 225 degrees. In some embodiments, the range of motion for an attachment panel joint ranges from 0 to about 210 degrees or less. In some embodiments, the range of motion for an attachment panel joint ranges from 0 to about 240 degrees. In some embodiments, the range of motion for an attachment panel joint ranges from 0 to about 270 degrees or greater.

DISCUSSION OF NOVELTY: The unique dimensions of the system frame design allow it to fold into 6 different shapes for 6 different functions and fit into a wide variety of truck beds. The particular overall dimensions and the individual panel sizes are the key to the full utility of the system design. Other panel sizes will not allow for the wide range of uses that system provides.

The extrusion is unique to the system because it has a curved upper surface with inverted V-shaped ridges. No other accessory ramp has an extruded shape like this. The unique shape provides for better traction on the ramp surface than what has been possible with previous designs.

The strap lock has a unique pivoting design that allows the user to orient the strap lock toward the load to be secured. Being able to orient the strap lock toward the load helps reduce edge forces on the strap and side forces on the locking mechanism. It also makes the device easier to use than current available designs. The lower component of the strap lock is anchored into the cleat holder on a truck bed. The upper portion contains the strap and locking mechanism. In between are a pivot screw and a set of washers to provide rotational motion. The pivot screw is a shoulder screw that maintains the proper clamping force and distance between the upper and lower assemblies.

In some embodiments, when the segmented panel assembly is in an expanded, fully stretched out position, the entire panel assembly is flat on a plane.

In some embodiments, the present invention provides for a method of forming a bed cover structure to cover an open pickup bed top (102), forming a work surface structure, forming a ramp structure, forming a sun shade structure, forming a lockable toolbox, or forming a bed extender using the novel panel assembly of the present invention.

In some embodiments, any of the joints between the panels (e.g., first, second, third joint, etc.) may have a range of motion between about 0 and 360 degrees. In some embodiments, any of the joints between the panels (e.g., first, second, third joint, etc.) may have a range of motion between about 0 and 180 degrees. In some embodiments, any of the joints between the panels (e.g., first, second, third joint, etc.) may have a range of motion between about 0 and less 180 degrees.

As used herein, a "reflex" angle is one that is more than 180 and less than 360 degrees. For example, the reflex angle is between about 181 and 205 degrees. For example, the reflex angle is between about 205 and 225 degrees. For example, the reflex angle is between about 225 and 245 degrees. For example, the reflex angle is between about 245 and 265 degrees. For example, the reflex angle is between about 265 and 270 degrees.

Figure 15A:
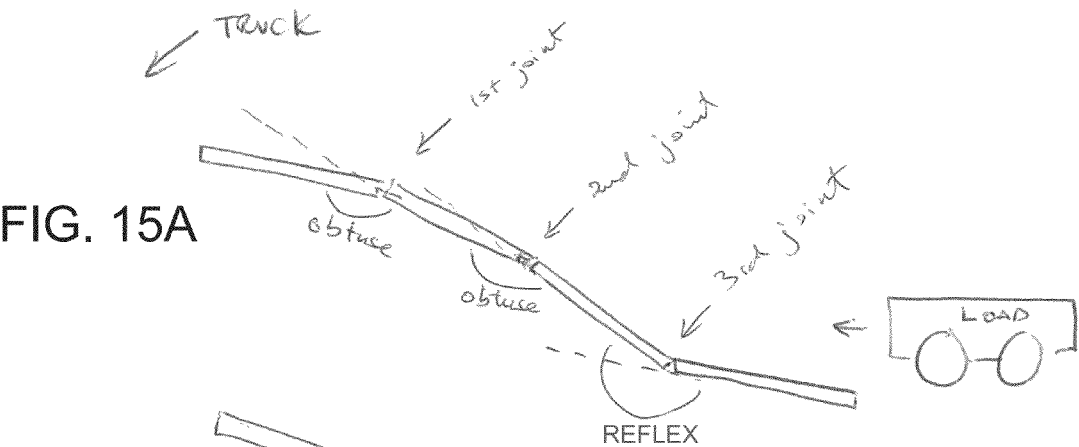
FIG. 15A-D show additional possible angular orientations between panels.
Figure 15B:
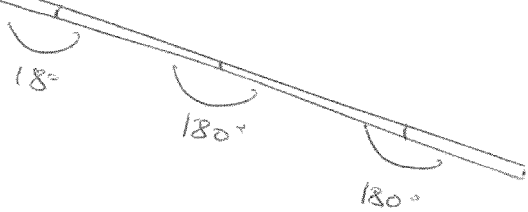
Figure 15C:
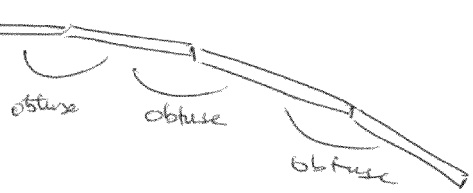
Figure 15D:
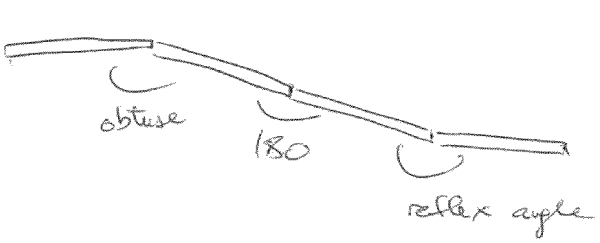

An "obtuse" angle is more than 90 and less than 180 degrees. For example, the obtuse angle is between about 91 and 105 degrees. For example, the obtuse angle is between about 105 and 125 degrees. For example, the obtuse angle is between about 125 and 145 degrees. For example, the obtuse angle is between about 145 and 165 degrees. For example, the obtuse angle is between about 165 and 179 degrees. In some embodiments, any two of the panels may form an obtuse angle between them. In some embodiments, any two of the panels may form a reflex angle between them. In some embodiments, all the panels together lie on a plane and the angles between any two of them is about 180 degrees. Examples are shown in FIGS. 15A-D.

In some embodiments, the panel assembly may be pivotably secured to any location on a truck bed. For example, the panel assembly may be pivotably secured to a mid-section of a truck bed. In some embodiments, the panel assembly may be pivotably secured to the side walls of the truck bed.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A configurable pickup bed utility management system (100) for enhancing functionality of a pickup bed (101), wherein the system (100) comprises:
   (a) a pickup bed (101), wherein a second hinge component (160) is disposed on a pickup bed posterior edge; and
   (b) a segmented panel assembly (105) comprising:
   (i) a planar first panel (110) having a first panel length (115) and a first panel width (116), wherein the first panel (110) comprises a first panel anterior edge (111) and a first panel posterior edge (112), wherein the first panel length (115) is measured from the first panel anterior edge (111) to the first panel posterior edge (112), wherein a first hinge component (150) is disposed on the first panel anterior edge (111), wherein a second hinge component (160) is disposed on the first panel posterior edge (112),
   wherein the first panel (110) is disposed on the pickup bed (101) via the first hinge component (150) of the first panel (110) pivotally connecting to the second hinge component (160) of the pickup bed (101),
   (ii) a planar second panel (120) having a second panel length (125) and a second panel width (126), wherein the second panel length (125) is greater than the first panel length (115), wherein the second panel (120) comprises a second panel anterior edge (121) and a second panel posterior edge (122), wherein the second panel length (125) is measured from the second panel anterior edge (121) to the second panel posterior edge (122), wherein a first hinge component (150) is disposed on the second panel anterior edge (121), wherein a second hinge component (160) is disposed on the second panel posterior edge (122),
   wherein the second panel (120) is disposed on the first panel (110) via the first hinge component (150) of the second panel (120) pivotally connecting to the second hinge component (160) of the first panel (110), wherein a first joint (128) range of motion is between 0 and an angle less than about 180 degrees, wherein upon full extension, the first panel (110) and the second panel (120) never lie on the same plane,
   (iii) a planar third panel (130) having a third panel length (135) and a third panel width (136), wherein the third panel length (135) is equal to the first panel length (115), wherein the third panel (130) comprises a third panel anterior edge (131) and a third panel posterior edge (132), wherein the third panel length (135) is measured from the third panel anterior edge (131) to the third panel posterior edge (132), wherein a first hinge component (150) is disposed on the third panel anterior edge (131), wherein a second hinge component (160) is disposed on the third panel posterior edge (132),
   wherein the third panel (130) is disposed on the second panel (120) via the first hinge component (150) of the third panel (130) pivotally connecting to the second hinge component (160) of the second panel (120), wherein a second joint (138) range of motion is between 0 and an angle less than about 180 degrees, wherein upon full extension, the second panel (120) and the third panel (130) never lie on the same plane, and
   (iv) a planar fourth panel (140) having a fourth panel length (145) and a fourth panel width (146), wherein the fourth panel length (145) is greater than the first panel length (115), wherein the fourth panel (140) comprises a fourth panel anterior edge (141) and a fourth panel posterior edge (142), wherein the fourth panel length (145) is measured from the fourth panel anterior edge (141) to the fourth panel posterior edge (142), wherein a first hinge component (150) is disposed on the fourth panel anterior edge (141), wherein a second hinge component (160) is not disposed on the first panel posterior edge (112),
   wherein the fourth panel (140) is disposed on the third panel (130) via the first hinge component (150) of the fourth panel (140) pivotally connecting to the second hinge component (160) of the third panel (130), wherein a third joint (148) range of motion is between 0 and about 180 degrees, wherein upon full extension, the third panel (130) and the fourth panel (140) lie on the same plane,
   wherein the first panel (110), the second panel (120), the third panel (130), and the fourth panel (140) are hereinafter collectively referred to as panels (190) each having a panel first side (191) and a panel second side (192), wherein the first panel width (116), the second panel width (126), the third panel width (136), and the fourth panel width (146) are equal,
   wherein a plurality of linear extrusions (170) are disposed on the panels (190) from the panel first side (191) to the panel second side (192), wherein each extrusion (170) comprises a plurality of ridges (172) disposed on a convexly curved extrusion top surface (171) thereon,
   wherein the panel assembly (105) is pivotally disposed on the pickup bed (101),
   wherein in a first configuration, the panel assembly (105) is fully extended over the pickup bed (101) forming a bed cover structure to cover an open pickup bed top (102), wherein the panel assembly (105) is supported over the open pickup bed top (102), wherein in a second configuration, the panel assembly (105) is fully extended posterior to the pickup bed (101) forming a work surface structure, wherein the panel assembly (105) is supported via one or more expanding legs (200) disposed on the panel assembly (105) and extending to a ground surface, wherein in a third configuration, the panel assembly (105) is fully extended posterior to the pickup bed (101) forming a ramp structure, wherein the panel assembly (105) is supported via the fourth panel posterior edge (142) disposed on the ground surface, wherein in a fourth configuration, the panel assembly (105) is partially extended posterior to the pickup bed (101) forming a sun shade structure, wherein the first panel (110) is disposed angularly with respect to the second panel (120), the third panel (130), and the fourth panel (140), wherein the panel assembly (105) is supported via one or more expanding legs (200) disposed on the panel assembly (105) and extending to a ground surface, wherein in a fifth configuration, the panel assembly (105) is folded into the pickup bed (101) forming a lockable toolbox, wherein each panel (190) is disposed angularly with respect to an adjoining panel (190), wherein the panel assembly (105) rests on a planar pickup bed bottom surface (103), wherein in a sixth configuration, the panel assembly (105) is folded into the pickup bed (101) forming a bed extender, wherein each panel (190) is disposed angularly with respect to an adjoining panel (190), wherein the first panel (110) and the fourth panel (140) overlap, wherein the panel assembly (105) rests on a planar pickup bed bottom surface (103).

2. The system (100) of claim 1, wherein the panel (190) comprises a grid structure.

3. The system (100) of claim 1, wherein the panel assembly (105) comprises a lockable pivoting strap lock (180), wherein a strap lock anchor (181) is disposed in a stake pocket of the pickup bed (101), wherein a spring-biased strap cinch (182) is pivotally disposed on the strap lock anchor (181) via a pivot screw (183), wherein a strap is disposed through the strap cinch (182), drawn tight, and held in place via the strap cinch (182), wherein the strap cinch (182) is releasable via a release lever (185), wherein a locking cover (186) is disposed over a strap cinch (182) for lockably securing the strap lock (180).

4. The system (100) of claim 1, wherein the panel assembly (105) is pivotally disposed on a tailgate (104) of the pickup bed (101).

5. The system (100) of claim 4, wherein the panel assembly (105) is pivotally disposed on a tailgate (104) of the pickup bed (101) via a pivoting attachment panel, wherein the planar attachment panel (210) has an attachment panel length and an attachment panel width, wherein the attachment panel (210) comprises an attachment panel anterior edge and an attachment panel posterior edge, wherein the attachment panel length is measured from the attachment panel anterior edge to the attachment panel posterior edge, wherein a second hinge component (160) is disposed on the attachment panel posterior edge, wherein the attachment panel (110) is disposed on the tailgate (104) of the pickup bed (101), wherein the panel assembly is pivotally disposed on the tailgate (104) of the pickup bed (101) via the first hinge component (150) of the first panel (110) pivotally connecting to the second hinge component (160) of the attachment panel (210).

6. The system (100) of claim 1, wherein the panel assembly (105) is pivotally disposed on the pickup bed (101) via a pivoting attachment panel, wherein the planar attachment panel (210) has an attachment panel length and an attachment panel width, wherein the attachment panel (210) comprises an attachment panel anterior edge and an attachment panel posterior edge, wherein the attachment panel length is measured from the attachment panel anterior edge to the attachment panel posterior edge, wherein a second hinge component (160) is disposed on the attachment panel posterior edge, wherein the attachment panel (110) is disposed on the pickup bed posterior edge, wherein the panel assembly is pivotally disposed on the pickup bed posterior edge via the first hinge component (150) of the first panel (110) pivotally connecting to the second hinge component (160) of the attachment panel (210).

7. A segmented panel assembly (105) for enhancing functionality of a pickup bed (101), wherein the assembly (105) comprises:

(a) a planar first panel (110) having a first panel length (115) and a first panel width (116), wherein the first panel (110) comprises a first panel anterior edge (111) and a first panel posterior edge (112), wherein the first panel length (115) is measured from the first panel anterior edge (111) to the first panel posterior edge (112), wherein a first hinge component (150) is disposed on the first panel anterior edge (111), wherein a second hinge component (160) is disposed on the first panel posterior edge (112), wherein the first panel (110) is disposed on a pickup bed (101) via the first hinge component (150) of the first panel (110) pivotally connecting to a second hinge component (160) of the pickup bed (101), (b) a planar second panel (120) having a second panel length (125) and a second panel width (126), wherein the second panel length (125) is greater than the first panel length (115), wherein the second panel (120) comprises a second panel anterior edge (121) and a second panel posterior edge (122), wherein the second panel length (125) is measured from the second panel anterior edge (121) to the second panel posterior edge (122), wherein a first hinge component (150) is disposed on the second panel anterior edge (121), wherein a second hinge component (160) is disposed on the second panel posterior edge (122), wherein the second panel (120) is disposed on the first panel (110) via the first hinge component (150) of the second panel (120) pivotally connecting to the second hinge component (160) of the first panel (110), wherein a first joint (128) range of motion is between 0 and an angle less than about 180 degrees, wherein upon full extension, the first panel (110) and the second panel (120) never lie on the same plane, (c) a planar third panel (130) having a third panel length (135) and a third panel width (136), wherein the third panel length (135) is equal to the first panel length (115), wherein the third panel (130) comprises a third panel anterior edge (131) and a third panel posterior edge (132), wherein the third panel length (135) is measured from the third panel anterior edge (131) to the third panel posterior edge (132), wherein a first hinge component (150) is disposed on the third panel anterior edge (131), wherein a second hinge component (160) is disposed on the third panel posterior edge (132), wherein the third panel (130) is disposed on the second panel (120) via the first hinge component (150) of the third panel (130) pivotally connecting to the second hinge component (160) of the second panel (120), wherein a second joint (138) range of motion is between 0 and an angle less than about 180 degrees, wherein upon full extension, the second panel (120) and the third panel (130) never lie on the same plane, and (d) a planar fourth panel (140) having a fourth panel length (145) and a fourth panel width (146), wherein the fourth panel length (145) is greater than the first panel length (115), wherein the fourth panel (140) comprises a fourth panel anterior edge (141) and a fourth panel posterior edge (142), wherein the fourth panel length (145) is measured from the fourth panel anterior edge (141) to the fourth panel posterior edge (142), wherein a first hinge component (150) is disposed on the fourth panel anterior edge (141), wherein a second hinge component (160) is not disposed on the first panel posterior edge (112), wherein the fourth panel (140) is disposed on the third panel (130) via the first hinge component (150) of the fourth panel (140) pivotally connecting to the second hinge component (160) of the third panel (130), wherein a third joint (148) range of motion is between 0 and about 180 degrees, wherein upon full extension, the third panel (130) and the fourth panel (140) lie on the same plane, wherein the first panel (110), the second panel (120), the third panel (130), and the fourth panel (140) are hereinafter collectively referred to as panels (190) each having a panel first side (191) and a panel second side (192), wherein the first panel width (116), the second panel width (126), the third panel width (136), and the fourth panel width (146) are equal, wherein a plurality of linear extrusions (170) are disposed on the panels (190) from the panel first side (191) to the panel second side (192), wherein each extrusion (170) comprises a plurality of ridges (172) disposed on a convexly curved extrusion top surface (171) thereon, wherein each ridge (172), wherein the panel assembly (105) is pivotally disposed on the pickup bed (101), wherein in a first configuration, the panel assembly (105) is fully extended over the pickup bed (101) forming a bed cover structure to cover an open pickup bed top (102), wherein the panel assembly (105) is supported over the open pickup bed top (102), wherein in a second configuration, the panel assembly (105) is fully extended posterior to the pickup bed (101) forming a work surface structure, wherein the panel assembly (105) is supported via one or more expanding legs (200) disposed on the panel assembly (105) and extending to a ground surface, wherein in a third configuration, the panel assembly (105) is fully extended posterior to the pickup bed (101) forming a ramp structure, wherein the panel assembly (105) is supported via the fourth panel posterior edge (142) disposed on the ground surface, wherein in a fourth configuration, the panel assembly (105) is partially extended posterior to the pickup bed (101) forming a sun shade structure, wherein the first panel (110) is disposed angularly with respect to the second panel (120), the third panel (130), and the fourth panel (140), wherein the panel assembly (105) is supported via one or more expanding legs (200) disposed on the panel assembly (105) and extending to a ground surface, wherein in a fifth configuration, the panel assembly (105) is folded into the pickup bed (101) forming a lockable toolbox, wherein each panel (190) is disposed angularly with respect to an adjoining panel (190), wherein the panel assembly (105) rests on a planar pickup bed bottom surface (103), wherein in a sixth configuration, the panel assembly (105) is folded into the pickup bed (101) forming a bed extender, wherein each panel (190) is disposed angularly with respect to an adjoining panel (190), wherein the first panel (110) and the fourth panel (140) overlap, wherein the panel assembly (105) rests on a planar pickup bed bottom surface (103).

8. A segmented panel assembly (105) comprising:
(a) a first panel (110);
(b) a second panel (120), wherein the second panel (120) is pivotally disposed on the first panel (110);
(c) a third panel (130), wherein the third panel (130) is pivotally disposed on the second panel (120); and
(d) a fourth panel (140), wherein the fourth panel (140) is pivotally disposed on the third panel (130);

wherein the first panel (110), the second panel (120), the third panel (130), and the fourth panel (140) are hereinafter collectively referred to as panels (190), wherein a plurality of linear extrusions (170) are disposed on the panels (190);

wherein in a first configuration, the panel assembly (105) is fully extended over a pickup bed (101) forming a bed cover structure to cover an open pickup bed top (102), wherein in a second configuration, the panel assembly (105) is fully extended posterior to the pickup bed (101) forming a work surface structure, wherein in a third configuration, the panel assembly (105) is fully extended posterior to the pickup bed (101) forming a ramp structure, wherein in a fourth configuration, the panel assembly (105) is partially extended posterior to the pickup bed (101) forming a sun shade structure, wherein in a fifth configuration, the panel assembly (105) is folded into the pickup bed (101) forming a lockable toolbox, wherein in a sixth configuration, the panel assembly (105) is folded into the pickup bed (101) forming a bed extender.

9. A segmented panel assembly (105) comprising:
(a) a plurality of panels (190) pivotally disposed in a series, wherein upon full extension, all panels never lie on a single plane, wherein upon full extension, at least a portion of the panel assembly (105) is non-linear;

wherein in a first configuration, the panel assembly (105) is fully extended over a pickup bed (101) forming a bed cover structure to cover an open pickup bed top (102), wherein in a second configuration, the panel assembly (105) is fully extended posterior to the pickup bed (101) forming a work surface structure, wherein in a third configuration, the panel assembly (105) is fully extended posterior to the pickup bed (101) forming a ramp structure, wherein in a fourth configuration, the panel assembly (105) is partially extended posterior to the pickup bed (101) forming a sun shade structure, wherein in a fifth configuration, the panel assembly (105) is folded into the pickup bed (101) forming a lockable toolbox, wherein in a sixth configuration, the panel assembly (105) is folded into the pickup bed (101) forming a bed extender.

* * * * *